(12) United States Patent
Bouchard

(10) Patent No.: US 12,250,241 B2
(45) Date of Patent: *Mar. 11, 2025

(54) ELECTRONIC SYSTEM FOR DYNAMIC ADAPTED SECURITY ANALYSIS OF NETWORK RESOURCE COMPONENTS

(71) Applicant: BANK OF AMERICA CORPORATION, Charlotte, NC (US)

(72) Inventor: Pierre Jacques Bouchard, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 330 days.

This patent is subject to a terminal disclaimer.

(21) Appl. No.: 17/886,832

(22) Filed: Aug. 12, 2022

(65) Prior Publication Data

US 2024/0056468 A1 Feb. 15, 2024

(51) Int. Cl.
*H04L 9/40* (2022.01)
(52) U.S. Cl.
CPC ...... *H04L 63/1433* (2013.01); *H04L 63/0281* (2013.01)
(58) Field of Classification Search
CPC .................. H04L 63/1433; H04L 63/0281
USPC ............................................. 726/25
See application file for complete search history.

(56) References Cited

U.S. PATENT DOCUMENTS

| | | | |
|---|---|---|---|
| 5,247,575 A | 9/1993 | Sprague et al. | |
| 5,646,997 A | 7/1997 | Barton | |
| 6,259,801 B1 | 7/2001 | Wakasu | |
| 7,073,059 B2 | 7/2006 | Worely, Jr. et al. | |
| 7,152,165 B1 | 12/2006 | Maheshwari et al. | |

(Continued)

OTHER PUBLICATIONS

Zhang et al., "A Vulnerability Detection System for Power Internet of Things Equipment," 2023 IEEE 3rd International Conference on Information Technology, Big Data and Artificial Intelligence (ICIBA) Year: 2023 | Conference Paper | Publisher: IEEE.

(Continued)

*Primary Examiner* — Michael S McNally
(74) *Attorney, Agent, or Firm* — Moore & Van Allen PLLC; Vaidehi Bachoti

(57) ABSTRACT

Embodiments of the present invention relate to apparatuses, systems, methods and computer program products for dynamic adapted security analysis of network resource components. Specifically, the system is typically structured for providing proactive network security by dynamically analyzing entering network resource components for vulnerabilities, establishing adapted validation thresholds and mitigation actions, and preventing unsuccessfully validated network resource components in a distributed network. In some aspects, in response to determining that a file attribute data element of the first network program resource component is of a predetermined file type, the system blocks the incoming file transfer associated with the first network program resource component. The system subsequently initiates, via a network quarantine component, dynamic validation of the first network program resource component based on at least one or more categorical network program resource component records associated with the dynamic validated network resource library.

19 Claims, 11 Drawing Sheets

(56) References Cited

U.S. PATENT DOCUMENTS

| | | |
|---|---|---|
| 7,581,103 B2 | 8/2009 | Home et al. |
| 8,065,712 B1 | 11/2011 | Cheng et al. |
| 8,621,610 B2 | 12/2013 | Oberheide et al. |
| 8,806,639 B2 | 8/2014 | Mohler |
| 9,367,701 B2 | 6/2016 | Merchan et al. |
| 9,753,844 B2 | 9/2017 | Kripalani |
| 9,813,450 B1 | 11/2017 | Wasiq |
| 10,129,222 B2 | 11/2018 | Maheshwari et al. |
| 10,324,690 B2 | 6/2019 | Ouali |
| 10,462,251 B2 | 10/2019 | O'Connell, Jr. et al. |
| RE47,704 E | 11/2019 | Briggs et al. |
| 10,554,475 B2 | 2/2020 | Weinstein et al. |
| 10,848,557 B2 | 11/2020 | Kaplan et al. |
| 10,984,041 B2 | 4/2021 | Sanur et al. |
| 11,030,318 B1 | 6/2021 | Shavro |
| 11,349,865 B1 | 5/2022 | Satpathy et al. |
| 2003/0028803 A1 | 2/2003 | Bunker, V et al. |
| 2003/0056116 A1 | 3/2003 | Bunker, V et al. |
| 2004/0260818 A1 | 12/2004 | Valois et al. |
| 2006/0048209 A1 | 3/2006 | Shelest et al. |
| 2006/0059253 A1 | 3/2006 | Goodman et al. |
| 2007/0074149 A1 | 3/2007 | Ognev et al. |
| 2008/0313733 A1 | 12/2008 | Kramer et al. |
| 2009/0125875 A1 | 5/2009 | Schmitter et al. |
| 2010/0251369 A1 | 9/2010 | Grant |
| 2011/0219205 A1 | 9/2011 | Wright |
| 2013/0097711 A1 | 4/2013 | Basavapatna et al. |
| 2015/0074281 A1 | 3/2015 | Vendrow |
| 2015/0244795 A1 | 8/2015 | Cantwell et al. |
| 2015/0363481 A1 | 12/2015 | Haynes |
| 2016/0134491 A1 | 5/2016 | Cordray et al. |
| 2017/0039218 A1 | 2/2017 | Prahlad et al. |
| 2017/0075719 A1 | 3/2017 | Scallan et al. |
| 2018/0144106 A1 | 5/2018 | Cholas et al. |
| 2018/0302373 A1 | 10/2018 | Ezell et al. |
| 2019/0114435 A1 | 4/2019 | Bhalla et al. |
| 2019/0265971 A1 | 8/2019 | Behzadi et al. |
| 2019/0273760 A1 | 9/2019 | Jacobs |
| 2019/0317944 A1 | 10/2019 | Deremigio et al. |
| 2020/0012779 A1 | 1/2020 | Chandrasekaran et al. |
| 2020/0285742 A1 | 9/2020 | Sawas |
| 2021/0124830 A1 | 4/2021 | Dinh et al. |
| 2021/0182975 A1 | 6/2021 | Neag et al. |
| 2021/0211438 A1 | 7/2021 | Trim et al. |
| 2021/0226981 A1 | 7/2021 | Huffman et al. |
| 2022/0108020 A1 | 4/2022 | Dang et al. |
| 2022/0286476 A1* | 9/2022 | Carroll ............... H04L 63/1425 |
| 2023/0120174 A1 | 4/2023 | Seck et al. |
| 2023/0281005 A1 | 9/2023 | Groenewegen et al. |
| 2024/0045971 A1 | 2/2024 | Ben Salem et al. |

OTHER PUBLICATIONS

Doynikova et al., "Analytical attack modeling and security assessment based on the common vulnerability scoring system," 2017 20th Conference of Open Innovations Association (FRUCT) Year: 2017 | Conference Paper | Publisher: IEEE.

* cited by examiner

ELECTRONIC SYSTEM FOR DYNAMIC ADAPTED SECURITY ANALYSIS OF NETWORK RESOURCE COMPONENTS

FIELD

In general, embodiments of the invention are directed to providing an enhanced network security for a distributed network. In particular, in invention is structured for network resource component tracking and analysis, as well as construction of network resource structure database, transforming data records, performing security validation and vulnerability analysis and construction of a dynamic validated network resource library. Moreover, the invention proves a dynamic quarantine validation library engine structured for dynamic and real-time analysis of network program resource components within the distributed network. Furthermore, the invention is structured for security analysis and validation during construction and deployment of dynamic network components.

BACKGROUND

With advancements in technology, entities have increasingly embraced a multitude of information technology resources such as network program resource components, in an attempt to administer an ever increasing number of operational activities associated with the functioning of the entities. However, these myriad information technology resources are provided at various systems, servers, subsystems, entity divisions, and/or the like, across a distributed network. Typically, one part of the distributed network may not even discern another new resource introduced at another part of the distributed network. Existing systems and technology are inept at identifying the information technology resources stored at and operating from a multitude devices and locations across the distributed network, much less evaluate these resources to identify vulnerabilities and conflicts with other upstream and downstream resources, thereby potentially imperiling the security of the network. Here, conventional systems can seldom identify or even distinguish between secure and validated resources, and those that are not. Moreover, in conventional system and technology, because the various instances of a particular technology resource across the distributed network are not distinguishable, any updates implemented are disparate such that one such instance of the resource is updated at one device of the distributed network, but not the rest, thereby leading to compatibility issues and endangering the protection of the network, which may subsequently further trigger malfunctions in operational activities. Thus, there is a need for technical solutions which alleviate the deficiencies of the existing systems and provide novel systems for providing an enhanced network security for a distributed network.

The previous discussion of the background to the invention is provided for illustrative purposes only and is not an acknowledgement or admission that any of the material referred to is or was part of the common general knowledge as at the priority date of the application.

BRIEF SUMMARY

Embodiments of the present invention address the above needs and/or achieve other advantages by providing a computerized system, and an associated method and computer program product, for dynamic network security for a distributed network. Specifically, in some embodiments, the invention is configured for network resource component tracking and analysis across a distributed network and construction of a dynamic validated network resource library. In some embodiments, the invention is configured for dynamic adapted security analysis of network resource components. In some embodiments, the invention is configured for a dynamic quarantine engine integration with a validated network resource component library for network security. In some embodiments, the invention is configured for security analysis and validation during construction and deployment of dynamic network components. In some embodiments the system comprises a computer apparatus including a memory device with computer-readable program code stored thereon, a communication device is configured to establish operative communication with a plurality of networked devices via a communication network, and a processing device operatively coupled to the memory device and the communication device configured to execute the computer-readable program code.

In some embodiments, the system is configured for network resource component tracking and analysis across a distributed network and construction of a dynamic validated network resource library. In this regard, the system is configured to: detect a plurality of network program resource components associated with a first distributed network; analyze code data associated with each of the plurality of network program resource components; determine, for each of the plurality of network program resource components, a plurality of technology elements associated with the network program resource component; construct, for each of the plurality of network program resource components, an associated network program resource component data structure comprising a plurality of attribute objects, wherein each of determined technology element of the plurality of technology elements associated with the plurality of network program resource components is associated with one or more of the plurality of attribute objects; transform the plurality of network program resource component data structures into a plurality of categorical network program resource component records by denormalizing the data structure file format associated with the plurality of network program resource component data structures; store the denormalized plurality of categorical network program resource component records associated with the plurality of network program resource component data structures, in a network resource structure database; perform vulnerability analysis of each of the plurality of categorical network program resource component records of the plurality of network program resource components; and in response to successful validation of a first network program resource component of the plurality of network program resource components, insert a first categorical network program resource component record associated with the first network program resource component, of the plurality of categorical network program resource component records at a dynamic validated network resource library.

In some embodiments, or in combination with the previous embodiment, the plurality of network program resource component data structures are in a human-readable format and/or comprise descriptive data. Here, transforming the plurality of network program resource component data structures into a plurality of categorical network program resource component records by denormalizing further comprises: parsing each of the plurality of network program resource component data structures to identify the associated plurality of attribute objects; determining, for each of the plurality of network program resource component data structures, a plurality of data fields that are required for the associated transformation to categorical network program resource component record; extracting, for each of the plurality of network program resource component data structures, data associated with the plurality of attribute objects from the plurality of network program resource component data structure; and constructing, for each of the plurality of network program resource component data structures, the associated categorical network program resource component record, wherein each of the plurality of categorical network program resource component records comprises the associated plurality of data fields associated with one or more of the plurality of attribute objects of the associated network program resource component data structure.

In some embodiments, or in combination with any of the previous embodiments, constructing the plurality of categorical network program resource component records further comprises: mapping each of the plurality of network program resource component data structures to a plurality of technology identifiers; and associating, for each of the plurality of network program resource component data structures, the extracted data associated with the plurality of attribute objects from the plurality of network program resource component data structure with the plurality of technology identifiers; and wherein for each of the plurality of categorical network program resource component records, the plurality of data fields are associated with the plurality of technology identifiers.

In some embodiments, or in combination with any of the previous embodiments, at least one first data field of the plurality of data fields of the first categorical network program resource component record comprises hierarchical dependency technology pointers to at least one second categorical network program resource component record of the plurality of categorical network program resource component records having a dependency relationship with the first categorical network program resource component record.

In some embodiments, or in combination with any of the previous embodiments, the system is configured to: receive a retrieval request for retrieving one or more categorical network program resource component records from the network resource structure database from a first network device; construct a retrieval rule based on determining one or more data fields associated with the retrieval request; retrieve one or more records of the plurality of categorical network program resource component records based on the retrieval rule; and transmit the one or more records of the plurality of categorical network program resource component records to the first network device.

In some embodiments, or in combination with any of the previous embodiments, detecting the plurality of network program resource components associated with the first distributed network further comprises: scanning a plurality of application session logs to identify a plurality of first application session logs associated with the first network program resource component of the plurality of network program resource components.

In some embodiments, or in combination with any of the previous embodiments, detecting the plurality of network program resource components associated with the first distributed network further comprises: synchronizing an external source repository via a firewall of the first distributed network; and identifying that an update associated with the external source repository is associated with the first network program resource component of the plurality of network program resource components.

In some embodiments, or in combination with any of the previous embodiments, performing the vulnerability analysis of each of the plurality of categorical network program resource component records further comprises: determining whether a version associated with the first network program resource component is associated with a critical security vulnerability record; and determining an unsuccessful validation of the first network program resource component in response to determining that the version of the first network program resource component is associated with the critical security vulnerability record.

In some embodiments, or in combination with any of the previous embodiments, performing the vulnerability analysis of each of the plurality of categorical network program resource component records further comprises: determining whether a version associated with the first network program resource component is associated with one or more critical security vulnerability records; determining a successful validation of the first network program resource component at a first time interval, in response to determining that the version of the first network program resource component is not associated with the one or more critical security vulnerability records; initiating an update of the one or more critical security vulnerability records; and determining, dynamically, an unsuccessful validation of the first network program resource component at a second time interval succeeding the first time interval, in response to determining that the version of the first network program resource component is associated with the updated one or more critical security vulnerability records.

In some embodiments, or in combination with any of the previous embodiments, performing the vulnerability analysis of each of the plurality of categorical network program resource component records further comprises: determining whether a scan of a version associated with the first network program resource component is successful; and determining an unsuccessful validation of the first network program resource component in response to determining that the scan of the version of the first network program resource component is unsuccessful.

In some embodiments, or in combination with any of the previous embodiments, performing the vulnerability analysis of each of the plurality of categorical network program resource component records further comprises: determining whether a source entity associated with the first network program resource component is associated with the one or more categorical network program resource component records of the dynamic validated network resource library; and determining an unsuccessful validation of the first network program resource component in response to determining that the source entity of the first network program resource component does not match the one or more categorical network program resource component records of the dynamic validated network resource library.

In some embodiments, or in combination with any of the previous embodiments, performing the vulnerability analysis of each of the plurality of categorical network program resource component records further comprises: determining whether a version of the first network program resource component is associated with a component file; and determining an unsuccessful validation of the first network program resource component in response to determining that the version of the first network program resource component does not match the component file.

In some embodiments, the system is configured for dynamic adapted security analysis of network resource components. In this regard, the system is configured to: detect, via a network proxy component, an incoming file transfer associated with a first network program resource component at a first distributed network initiated by a first user at first network device of the first distributed network; in response to determining, via the network proxy component, that a file attribute data element associated with the first network program resource component is associated with a predetermined file type, (i) block the incoming file transfer associated with the first network program resource component at the first distributed network, and (ii) automatically redirect a current interface displayed at the first network device to a dynamic validated network resource library interface associated with a dynamic validated network resource library; receive, via the dynamic validated network resource library interface, a request for the first network program resource component from the first user via the first network device; download the first network program resource component to a network quarantine component associated with the first distributed network; initiate, via the network quarantine component, dynamic validation of the first network program resource component based on at least one or more categorical network program resource component records associated with the dynamic validated network resource library; in response to a successful validation of the first network program resource component, construct a transmission of the downloaded first network program resource component to the first network device such that the first network program resource component cannot be executed at the first network device when the dynamic validated network resource library does not comprise the first network program resource component; and initiate the transmission of the downloaded first network program resource component to the first network device.

In some embodiments, or in combination with any of the previous embodiments, the system is configured to: construct a retrieval rule associated with the first network program resource component based on determining one or more data fields associated with the network program resource component; retrieve one or more first categorical network program resource component records of a plurality of categorical network program resource component records based on the retrieval rule from the dynamic validated network resource library; parse the one or more first categorical network program resource component records to determine whether the one or more first categorical network program resource component records match the first network program resource component; and in response to determining that the one or more first categorical network program resource component records match the first network program resource component, allow installation of the first network program resource component at the first network device.

In some embodiments, or in combination with any of the previous embodiments, the system is configured to: construct a retrieval rule associated with the first network program resource component based on determining one or more data fields associated with the network program resource component; retrieve one or more first categorical network program resource component records of a plurality of categorical network program resource component records based on the retrieval rule from the dynamic validated network resource library; parse the one or more first categorical network program resource component records to determine whether the one or more first categorical network program resource component records match the first network program resource component; and in response to determining that the one or more first categorical network program resource component records do not match the first network program resource component, prevent installation of the first network program resource component at the first network device.

In some embodiments, or in combination with any of the previous embodiments, the dynamic validation of the first network program resource component further comprises: determining whether a version associated with the first network program resource component is associated with a critical security vulnerability record; and determining an unsuccessful validation of the first network program resource component in response to determining that the version of the first network program resource component is associated with the critical security vulnerability record.

In some embodiments, or in combination with any of the previous embodiments, the dynamic validation of the first network program resource component further comprises: determining whether a version associated with the first network program resource component is associated with one or more critical security vulnerability records; determining a successful validation of the first network program resource component at a first time interval, in response to determining that the version of the first network program resource component is not associated with the one or more critical security vulnerability records; initiating an update of the one or more critical security vulnerability records; and determining, dynamically, an unsuccessful validation of the first network program resource component at a second time interval succeeding the first time interval, in response to determining that the version of the first network program resource component is associated with the updated one or more critical security vulnerability records.

In some embodiments, or in combination with any of the previous embodiments, the dynamic validation of the first network program resource component further comprises: determining whether a scan of a version associated with the first network program resource component is successful; and determining an unsuccessful validation of the first network program resource component in response to determining that the scan of the version of the first network program resource component is unsuccessful.

In some embodiments, or in combination with any of the previous embodiments, the dynamic validation of the first network program resource component further comprises: determining whether a source entity associated with the first network program resource component is associated with the one or more categorical network program resource component records of the dynamic validated network resource library; and determining an unsuccessful validation of the first network program resource component in response to determining that the source entity of the first network program resource component does not match the one or more categorical network program resource component records of the dynamic validated network resource library.

In some embodiments, or in combination with any of the previous embodiments, the dynamic validation of the first network program resource component further comprises: determining whether a version of the first network program resource component is associated with a component file; and determining an unsuccessful validation of the first network program resource component in response to determining that the version of the first network program resource component does not match the component file.

In some embodiments, or in combination with any of the previous embodiments, determining the file attribute data element is associated with a file name of the first network program resource component.

In some embodiments, or in combination with any of the previous embodiments, determining that the file attribute data element associated with the first network program resource component is associated with the predetermined file type comprises determining that the first network program resource component is an executable type file.

In some embodiments, or in combination with any of the previous embodiments, the system is configured to: determine whether the first user is associated with a download permission at the first network device; determine whether the first user is associated with an install permission at the first network device; and in response to determining that the first user is associated with the download permission and the install permission at the first network device, revoke the download permission or the install permission of the first user at the first network device.

In some embodiments, or in combination with any of the previous embodiments, the system is configured to: in response to determining, via the network proxy component, that a file attribute data element associated with a second network program resource component is associated with the predetermined file type, block the incoming file transfer associated with the second network program resource component at the first distributed network; in response to a request for the second network program resource component from a second network device, download the second network program resource component to the network quarantine component associated with the first distributed network; and in response to an unsuccessful validation of the first network program resource component, prevent transmission of the second network program resource into the first distributed network.

In some embodiments, the system is configured for a dynamic quarantine engine integration with a validated network resource component library for network security. In this regard, the system is configured to: download, via a perimeter network layer of a first distributed network, a first network program resource component from an external source location to a dynamic quarantine validation library engine associated with the first distributed network; initiate, via the dynamic quarantine validation library engine, a first dynamic deconstructed validation of the first network program resource component comprising: splitting the first network program resource component into a plurality of program resource component portions; and validating each of the plurality of program resource component portions based on at least one or more categorical network program resource component records associated with the dynamic validated network resource library; in response to a successful first dynamic deconstructed validation of the first network program resource component, construct a first categorical network program resource component record associated with the first network component at network resource structure database; transmit the first categorical network program resource component record associated with the first network component to the dynamic quarantine validation library engine; initiate, via the dynamic quarantine validation library engine, a second dynamic deconstructed validation of the first categorical network program resource component record associated with the first network component; in response to successful validation of a second dynamic deconstructed validation of the first categorical network program resource component, insert the first categorical network program resource component record associated with the first network program resource component at a dynamic validated network resource library; and transmit the downloaded first network program resource component to a validated component repository.

In some embodiments, or in combination with any of the previous embodiments, the system is configured to: detect, via a network proxy component, an incoming file transfer associated with a first network program resource component at a first distributed network initiated by a first user at first network device of the first distributed network; and in response to determining, via the network proxy component, that a file attribute data element associated with the first network program resource component is associated with a predetermined file type, (i) block the incoming file transfer associated with the first network program resource component at the first distributed network, and (ii) automatically redirect a current interface displayed at the first network device to a dynamic validated network resource library interface associated with a dynamic validated network resource library; determine whether the first network program resource component matches the dynamic validated network resource library; and wherein, the download of the first network program resource component from the external source location to the dynamic quarantine validation library engine is in response to determining that the first network program resource component does not match the dynamic validated network resource library.

In some embodiments, or in combination with any of the previous embodiments, the system is configured to: receive, at the dynamic validated network resource library, a request for the first network program resource component from the first user via the first network device; and wherein, the download of the first network program resource component from the external source location to the dynamic quarantine validation library engine is in response to determining that the first network device is associated with an internal network layer of the first distributed network; and wherein, the download of the first network program resource component from the external source location to the dynamic quarantine validation library engine comprises authenticating the download based on successful validation of a predetermined device credential associated with the first network device.

In some embodiments, or in combination with any of the previous embodiments, the first dynamic deconstructed validation of the first network program resource component further comprises: determining whether a version associated with at least one of the plurality of program resource component portions of the first network program resource component is associated with a critical security vulnerability record; and determining an unsuccessful validation of the first network program resource component in response to determining that the version of the at least one of the plurality of program resource component portions of the first network program resource component is associated with the critical security vulnerability record.

In some embodiments, or in combination with any of the previous embodiments, the first dynamic deconstructed validation of the first network program resource component further comprises: determining whether a first version associated with a first program resource component portion of the plurality of program resource component portions of the first network program resource component is associated with one or more critical security vulnerability records; determining the successful first dynamic deconstructed validation of the first network program resource component at a first time interval, in response to determining that the first version is not associated with the one or more critical security vulnerability records; initiating an update of the one or more critical security vulnerability records; and determining, dynamically, an unsuccessful validation of the first network program resource component at a second time interval succeeding the first time interval, in response to determining that a second version associated with a second program resource component portion of the plurality of program resource component portions of the first network program resource component is associated with the updated one or more critical security vulnerability records.

In some embodiments, or in combination with any of the previous embodiments, the first dynamic deconstructed validation of the first network program resource component further comprises: determining whether a scan of a version associated with at least one of the plurality of program resource component portions of the first network program resource component is successful; and determining an unsuccessful validation of the first network program resource component in response to determining that the scan of the version of the at least one of the plurality of program resource component portions of the first network program resource component is unsuccessful.

In some embodiments, or in combination with any of the previous embodiments, the first dynamic deconstructed validation of the first network program resource component further comprises: determining whether a source entity associated with at least one of the plurality of program resource component portions of the first network program resource component is associated with the one or more categorical network program resource component records of the dynamic validated network resource library; and determining an unsuccessful validation of the first network program resource component in response to determining that the source entity of the at least one of the plurality of program resource component portions of the first network program resource component does not match the one or more categorical network program resource component records of the dynamic validated network resource library.

In some embodiments, or in combination with any of the previous embodiments, the first dynamic deconstructed validation of the first network program resource component further comprises: determining whether a version of at least one of the plurality of program resource component portions of the first network program resource component is associated with a component file; and determining an unsuccessful validation of the first network program resource component in response to determining that the version of the at least one of the plurality of program resource component portions of the first network program resource component does not match the component file.

In some embodiments, the system is configured for security analysis and validation during construction and deployment of dynamic network components. In this regard, the system is configured to: detect, via a lower deployment environment system, transmission of a first resource program code to a quality control testing system; transmit the first resource program code to a lower build deploy system associated with the lower deployment environment system, prior to transmission of the first resource program code to a quality control testing system; augment, via the lower build deploy system, a code merge associated with the first resource program code at a continuous integration system with a first validation of the first resource program code at a first time interval, prior to transmission of the first resource program code to a quality control testing system, wherein the first validation of the program code comprises: determining whether the first resource program code is associated with one or more critical security vulnerability records; determining a successful first validation of the first resource program code in response to determining that the first resource program code is not associated with the critical security vulnerability record; and in response to the successful first validation of the first resource program code, storing the first resource program code at an artifactory system; receive, via a lower deployment system, a request for transmission of the validated first resource program code to the quality control testing system from a first network device at a second time interval succeeding the first time interval; extract, via the lower deployment system, the first resource program code from the artifactory system to the lower build deploy system; initiate a second validation of the first resource program code at the second time interval, based on at least one or more categorical network program resource component records associated with a dynamic validated network resource library; in response to a successful second validation of the first resource program code, (i) restore the first resource program code at the artifactory system, and (ii) allow deployment of the first resource program code to the lower deployment environment.

In some embodiments, or in combination with any of the previous embodiments, the second validation of the first resource program code further comprises: splitting the first resource program code component into a plurality of code portions; and validating each of the plurality of code portions based on at least the one or more categorical network program resource component records associated with the dynamic validated network resource library.

In some embodiments, or in combination with any of the previous embodiments, the second validation of the first resource program code further comprises: constructing a retrieval rule based on determining one or more data fields associated with the first resource program code; and determining one or more dependent network program resource components of the first distributed network that are mapped to the first resource program code based on analyzing one or more one or more records of the plurality of categorical network program resource component records that match the retrieval rule; and wherein the second validation of the first resource program code comprises validating each of the one or more dependent network program resource components of the first distributed network.

In some embodiments, or in combination with any of the previous embodiments, the system is configured to: determine a plurality of technology elements associated with the first resource program code; construct a first network program resource component data structure comprising a plurality of attribute objects, wherein each of the plurality of technology elements is associated with one or more of the plurality of attribute objects; transform the first network program resource component data structure into a first categorical network program resource component record by denormalizing a data structure file format associated with the first network program resource component data structure; store the first categorical network program resource component record at a network resource structure database; and in response to a successful second validation of the first resource program code, store the first categorical network program resource component record at the dynamic validated network resource library.

In some embodiments, or in combination with any of the previous embodiments, the system is configured to: in response to a successful second validation of the first resource program code, insert a deploy flag at the first resource program code at the artifactory system, wherein the deploy flag is structured to allow deployment of the first resource program code to the lower deployment environment. deploy the first resource program code to the lower deployment environment via a script deploy component; receive, via a higher deployment system, a request for transmission of the first resource program code from the lower deployment environment to a higher deployment environment at a third time interval succeeding the second time interval; validate a signature credential associated with the first resource program code; (i) in response to determining that the first resource program code is associated with a deploy flag, and (ii) in response to the successful validation of the signature credential, initiate a third validation of the first resource program code at the second time interval, based on at least one or more categorical network program resource component records associated with the dynamic validated network resource library; and in response to a successful third validation of the first resource program code, initiate deployment of the first resource program code to the higher deployment environment via the script deploy component, wherein the higher deployment environment is associated with a production environment of the first distributed network.

In some embodiments, or in combination with any of the previous embodiments, the system is configured to: in response to a successful second validation of the first resource program code, insert a deploy flag at the first resource program code at the artifactory system, wherein the deploy flag is structured to allow deployment of the first resource program code to the lower deployment environment.

In some embodiments, or in combination with any of the previous embodiments, the system is configured to: in response to an unsuccessful second validation of a second resource program code, insert a prevent deploy flag at the second resource program code at the artifactory system, wherein the prevent deploy flag is structured to prevent deployment of the second resource program code to the lower deployment environment.

In some embodiments, or in combination with any of the previous embodiments, the artifactory system is structured to store binary code associated with the first resource program code.

In some embodiments, or in combination with any of the previous embodiments, the second validation of the first resource program code further comprises: determining whether a version associated with the first resource program code is associated with a critical security vulnerability record; and determining the successful second validation of the first resource program code in response to determining that the version of the first resource program code is not associated with the critical security vulnerability record.

In some embodiments, or in combination with any of the previous embodiments, the second validation of the first resource program code further comprises: determining whether a scan of a version associated with the first resource program code is successful; and determining the successful second validation of the first resource program code in response to determining that the scan of the version of the first resource program code is successful.

In some embodiments, or in combination with any of the previous embodiments, wherein the second validation of the first resource program code further comprises: determining whether a source entity associated with the first resource program code is associated with the one or more categorical network program resource component records of the dynamic validated network resource library; and determining the successful second validation of the first resource program code in response to determining that the source entity of the first resource program code matches the one or more categorical network program resource component records of the dynamic validated network resource library.

In some embodiments, or in combination with any of the previous embodiments, the second validation of the first resource program code further comprises: determining whether a version of the first resource program code is associated with a component file; and determining the successful second validation of the first resource program code in response to determining that the version of the first resource program code does matches the component file.

BRIEF DESCRIPTION OF THE DRAWINGS

Figure 1:
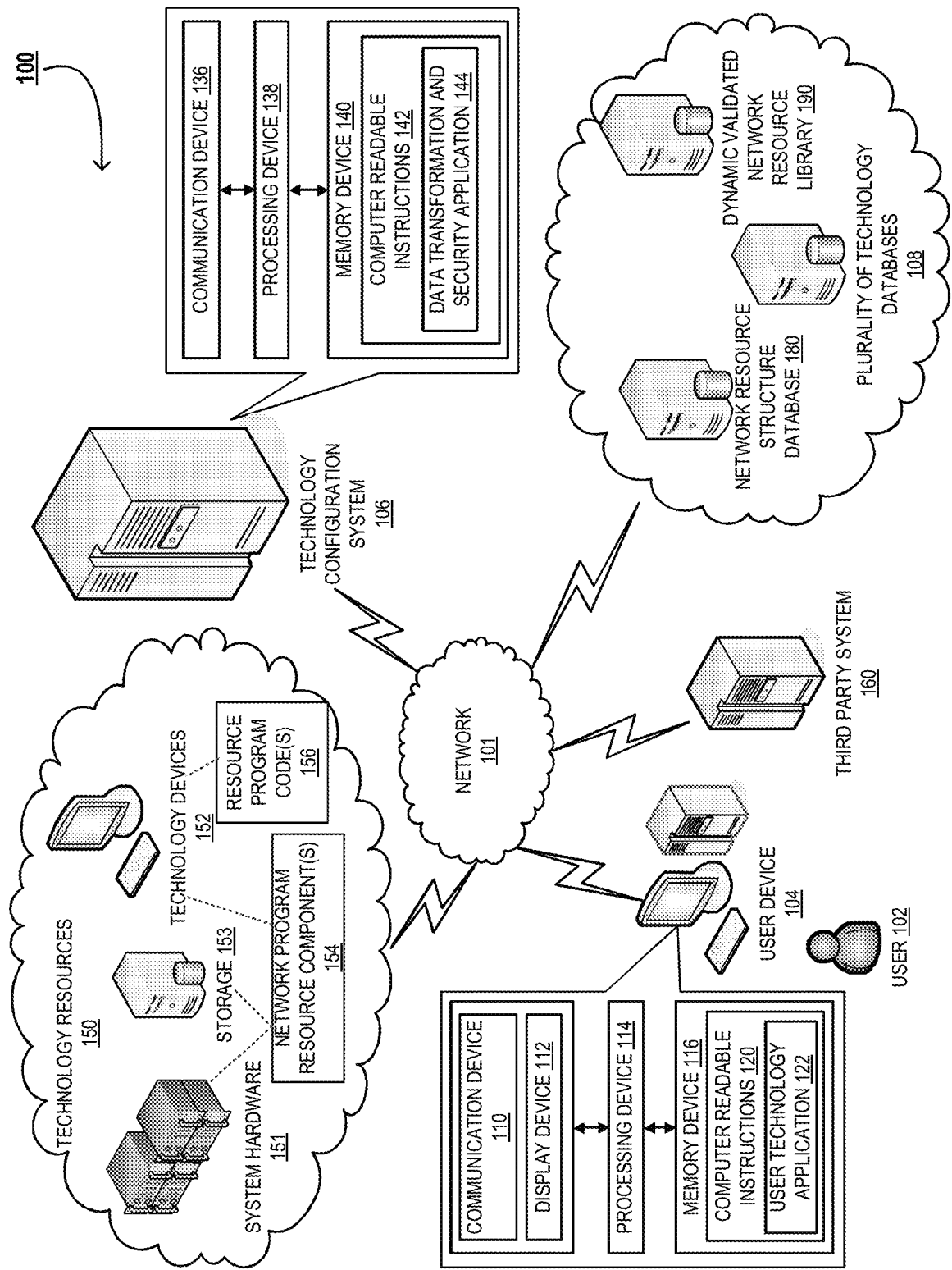
Figure 2:
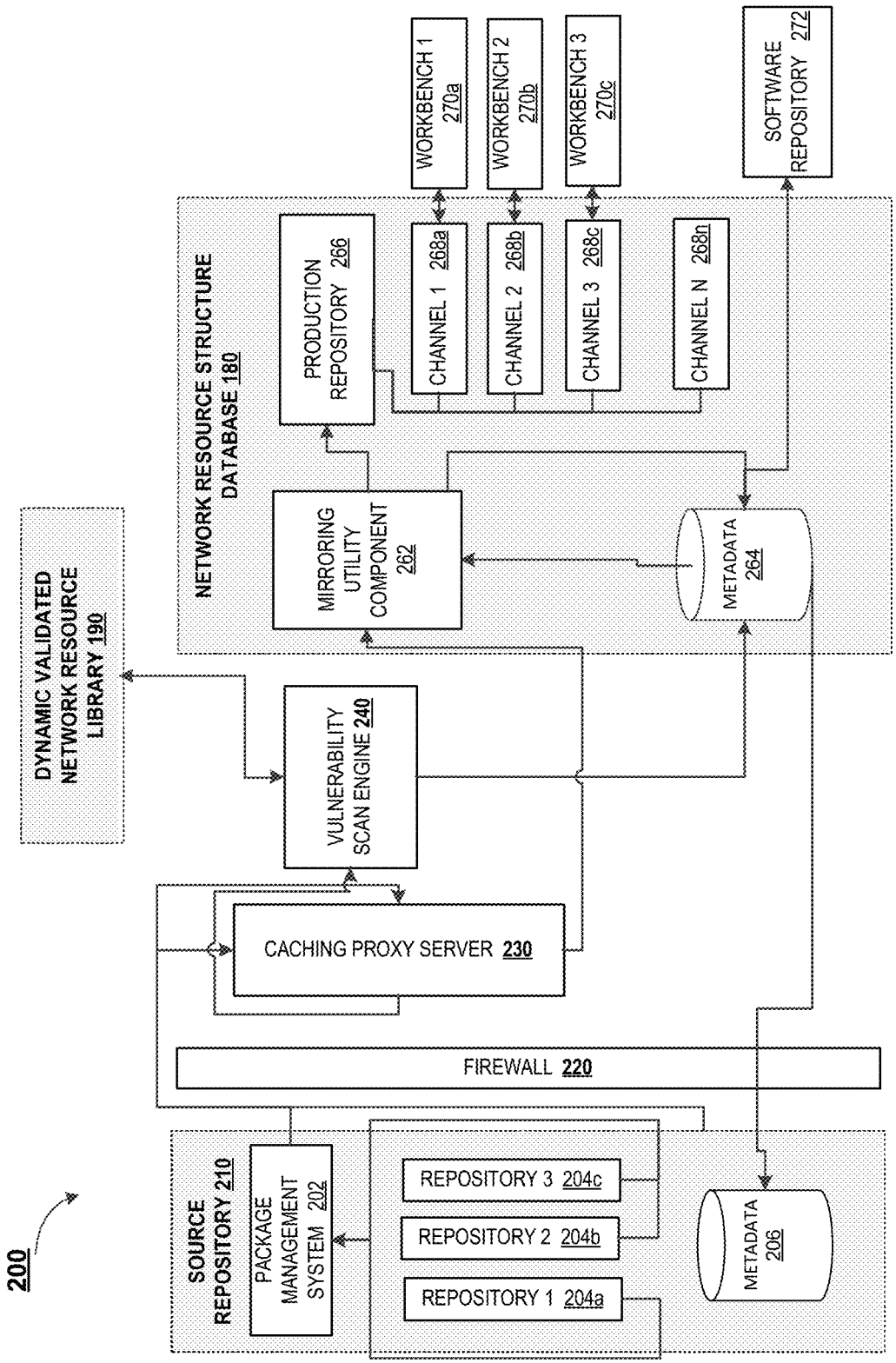
Figure 3A:
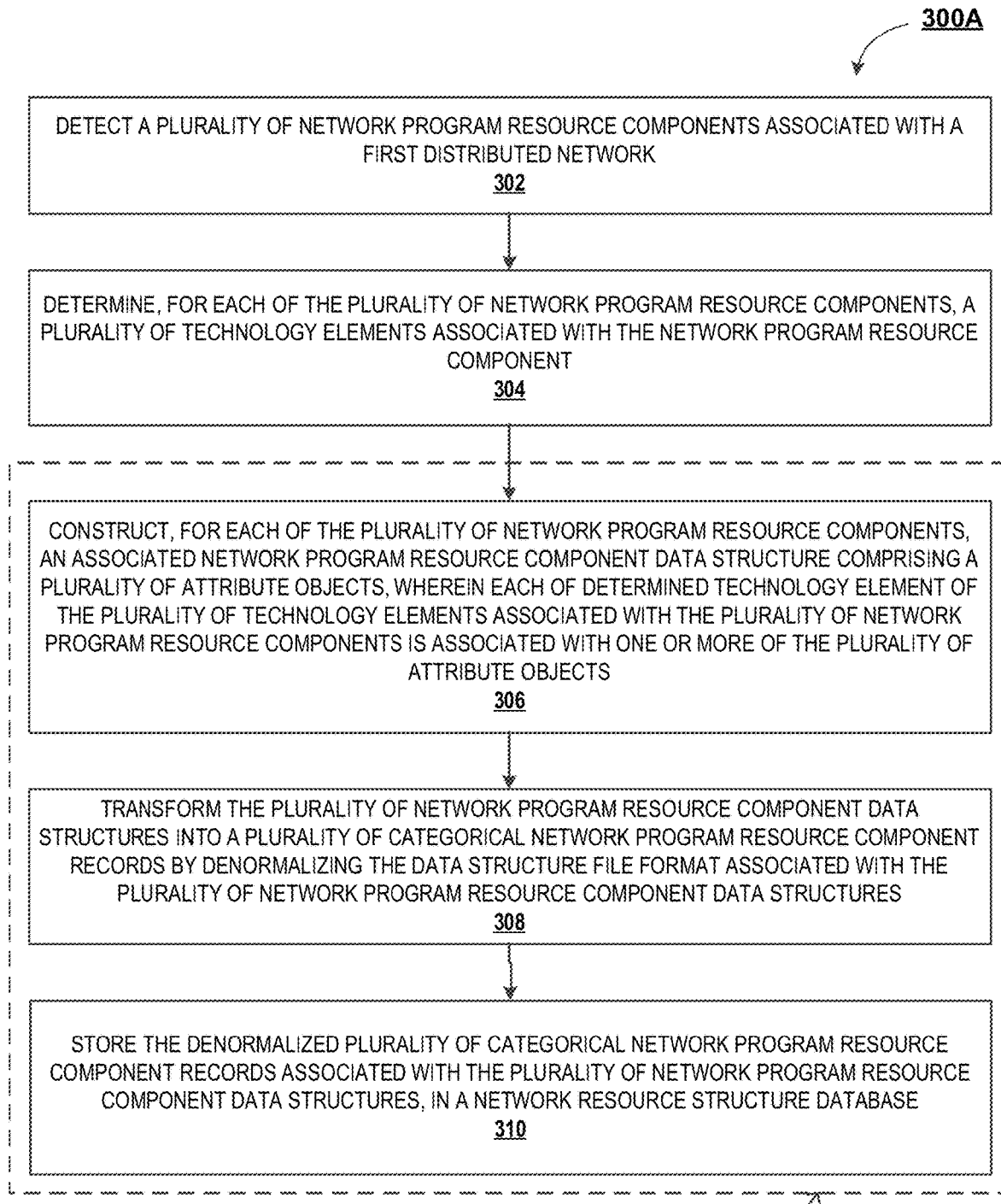
Figure 3B:
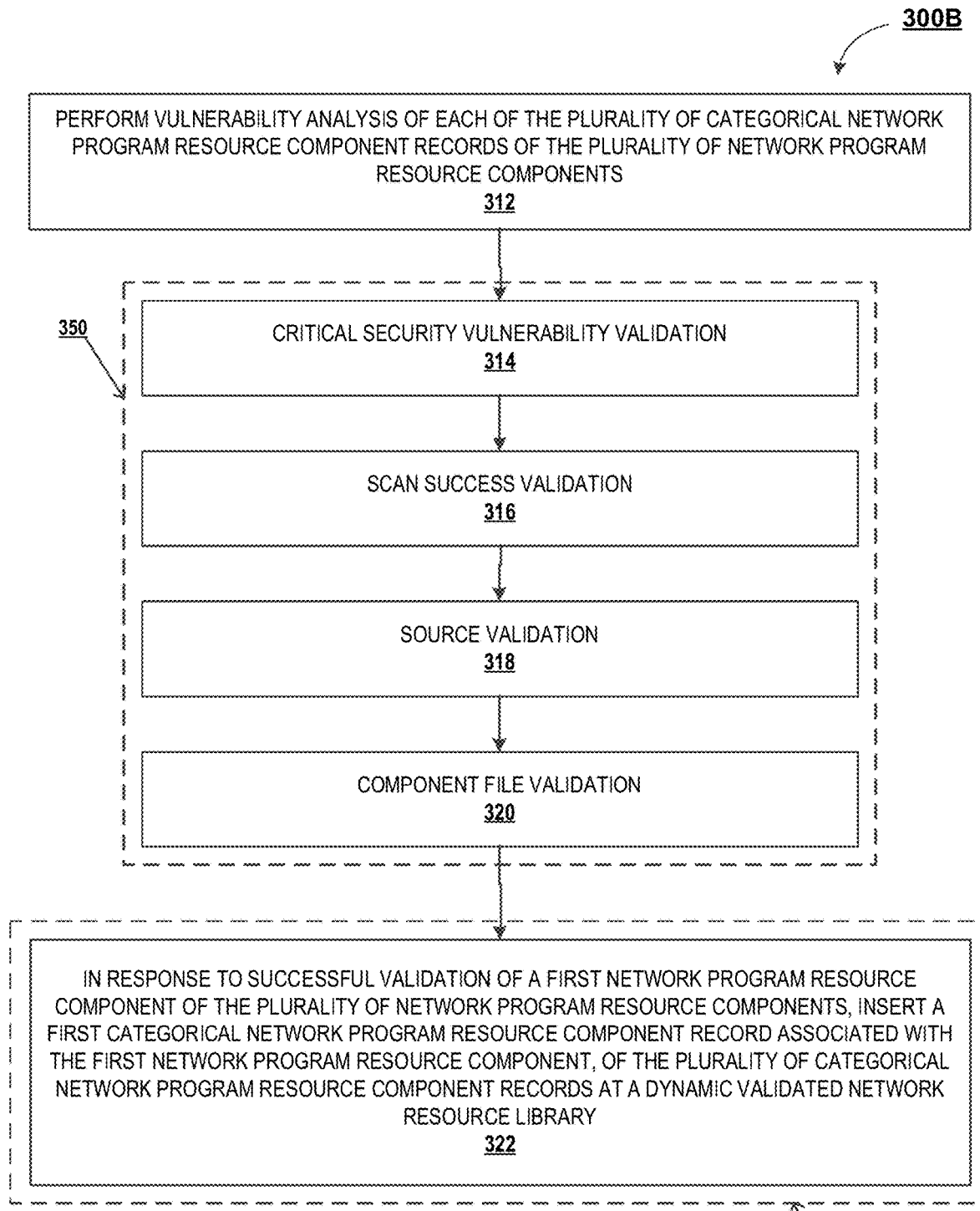
Figure 4:
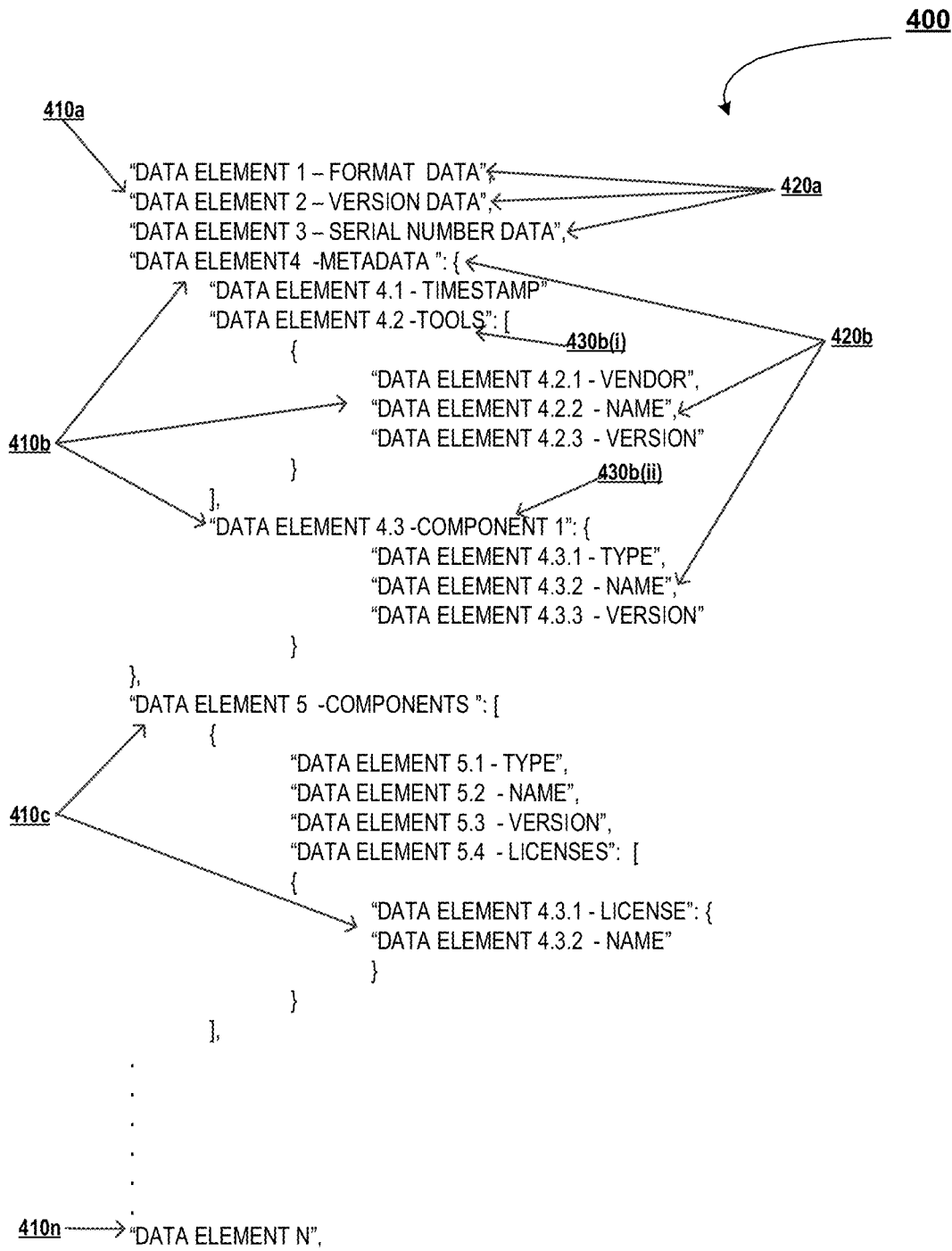
Figure 5:
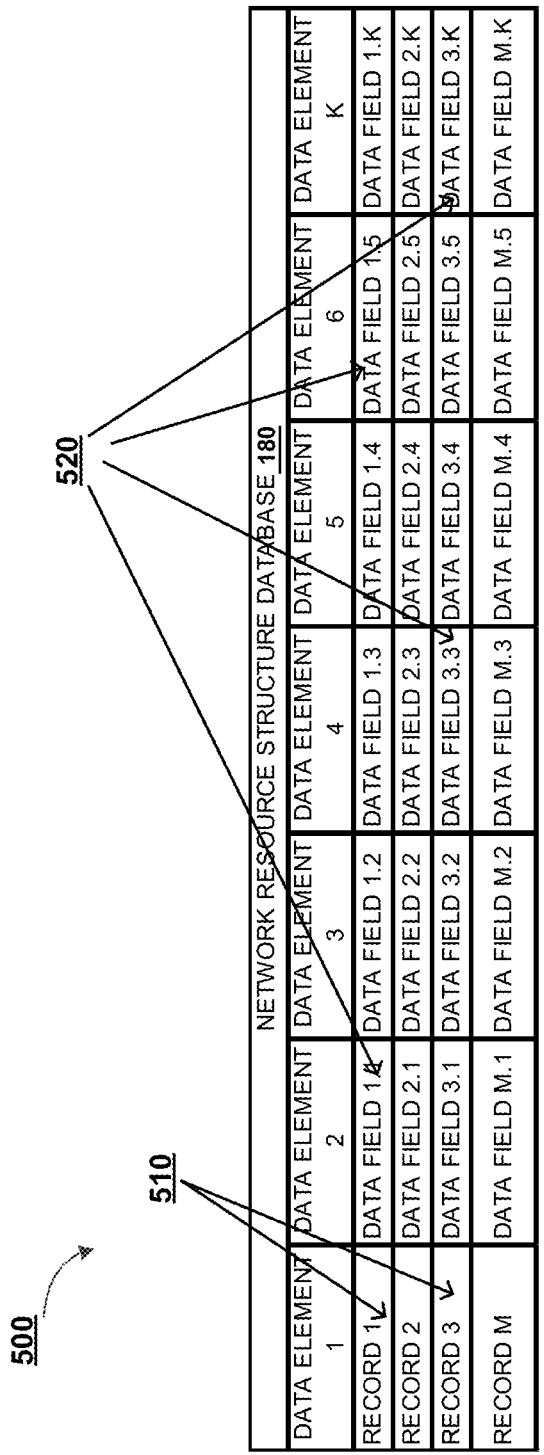
Figure 6:
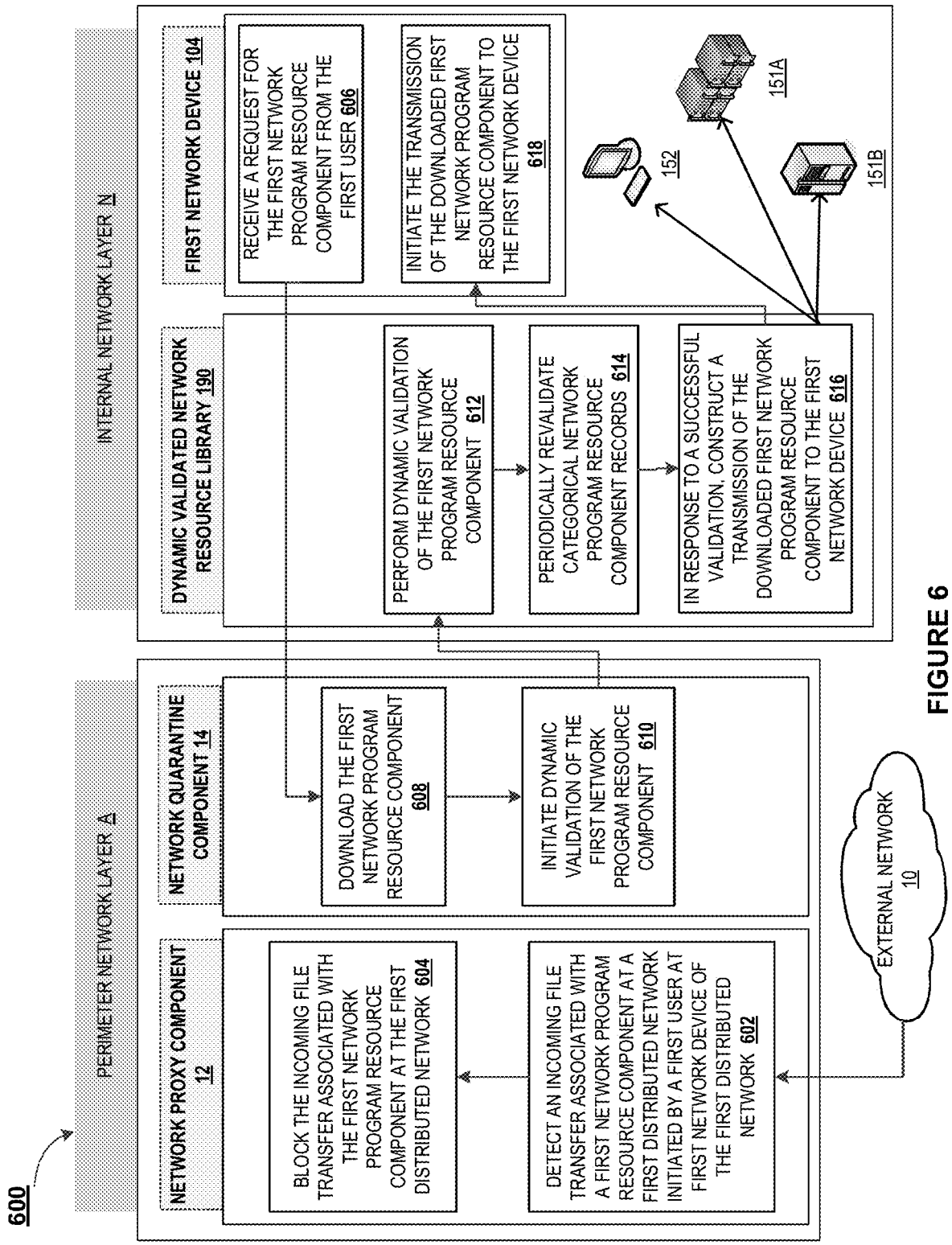
Figure 7:
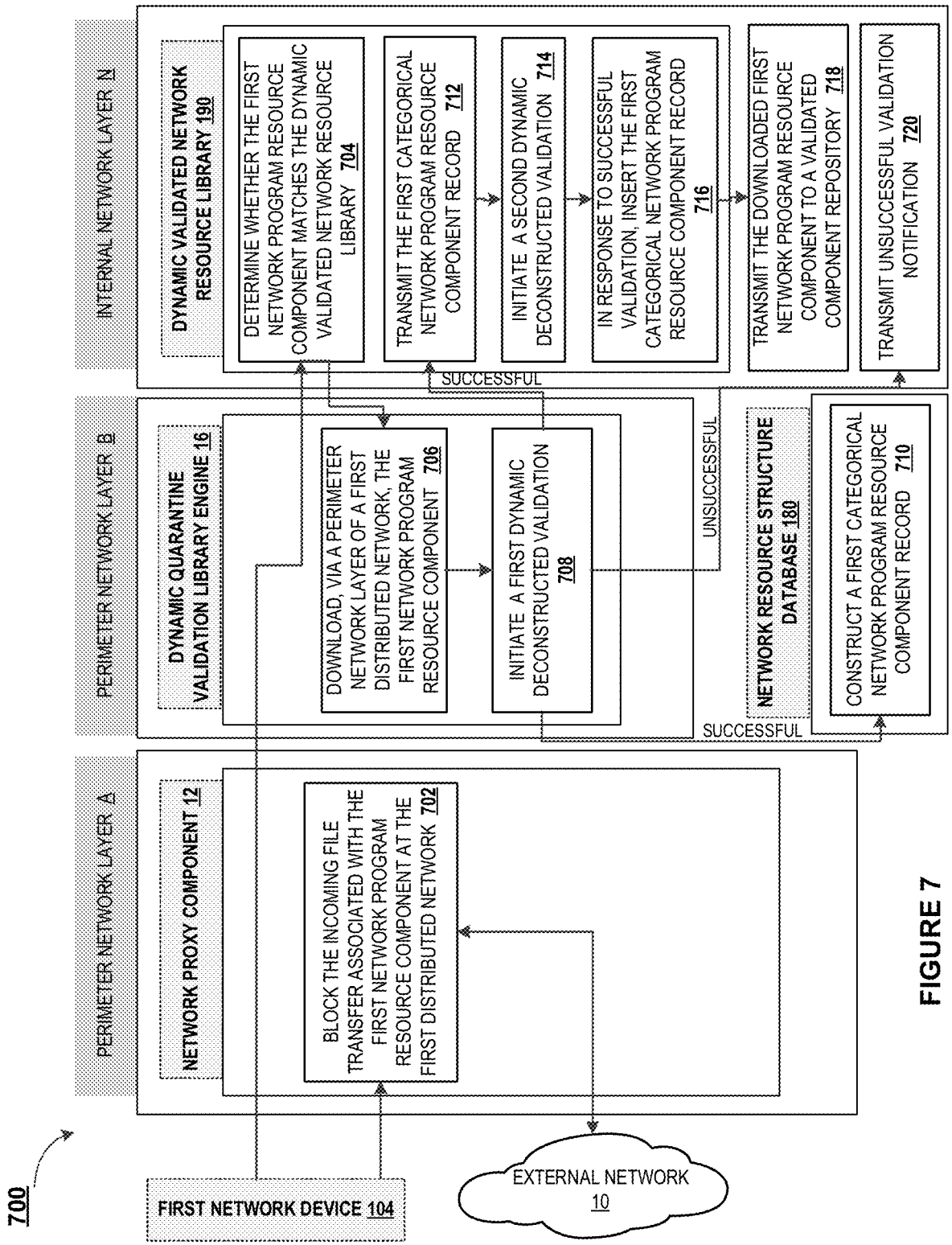
Figure 8:
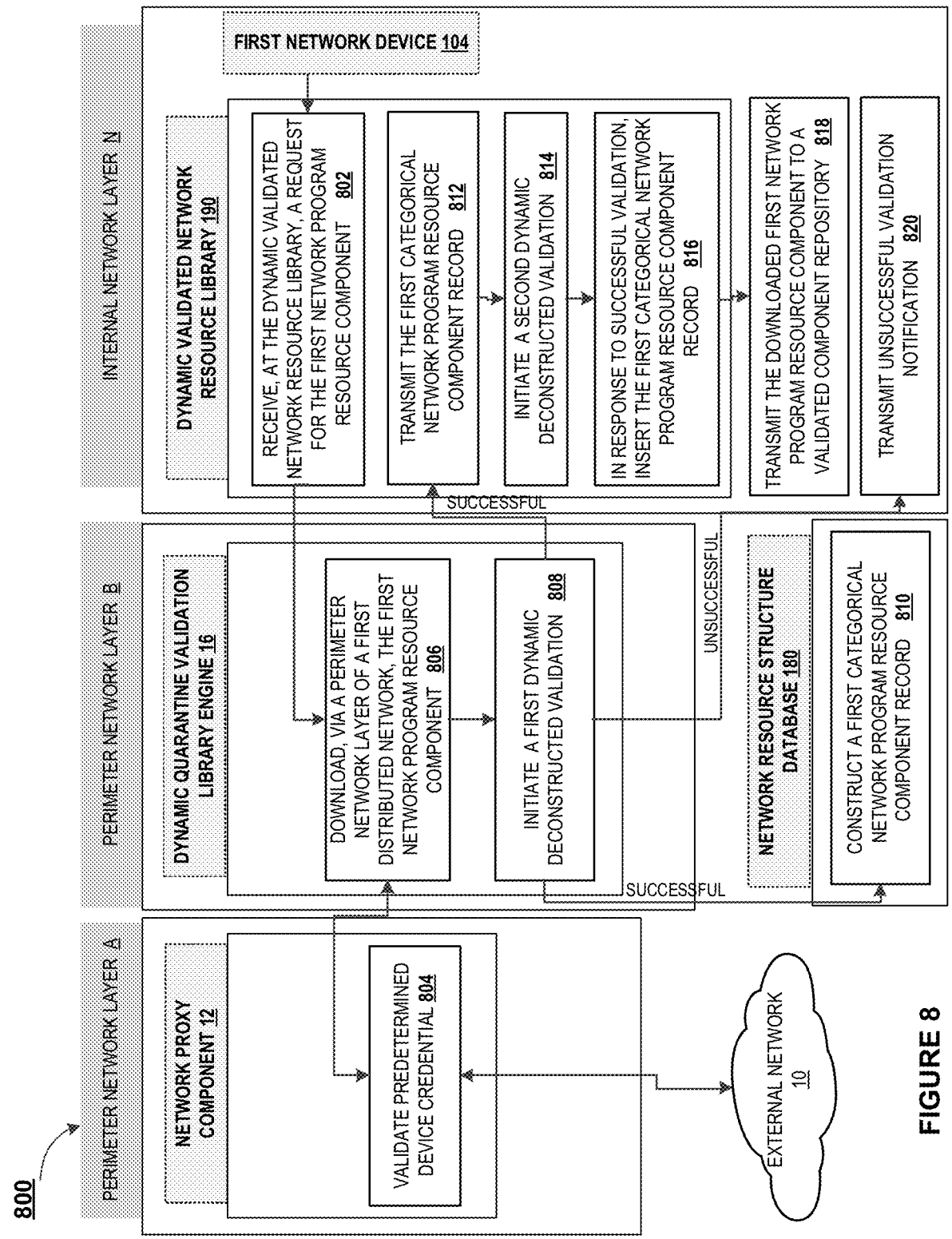
Figure 9A:
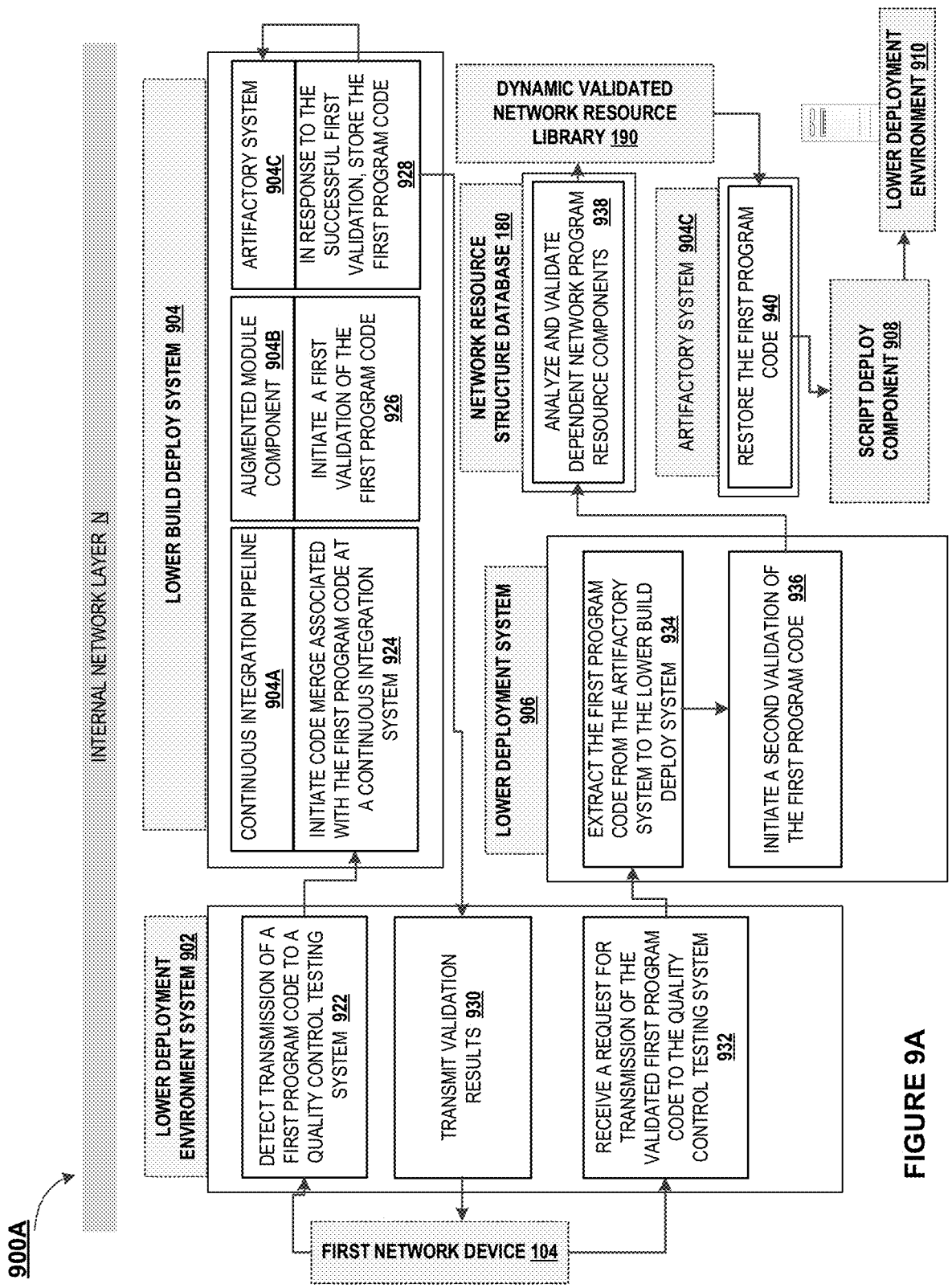
Figure 9B:
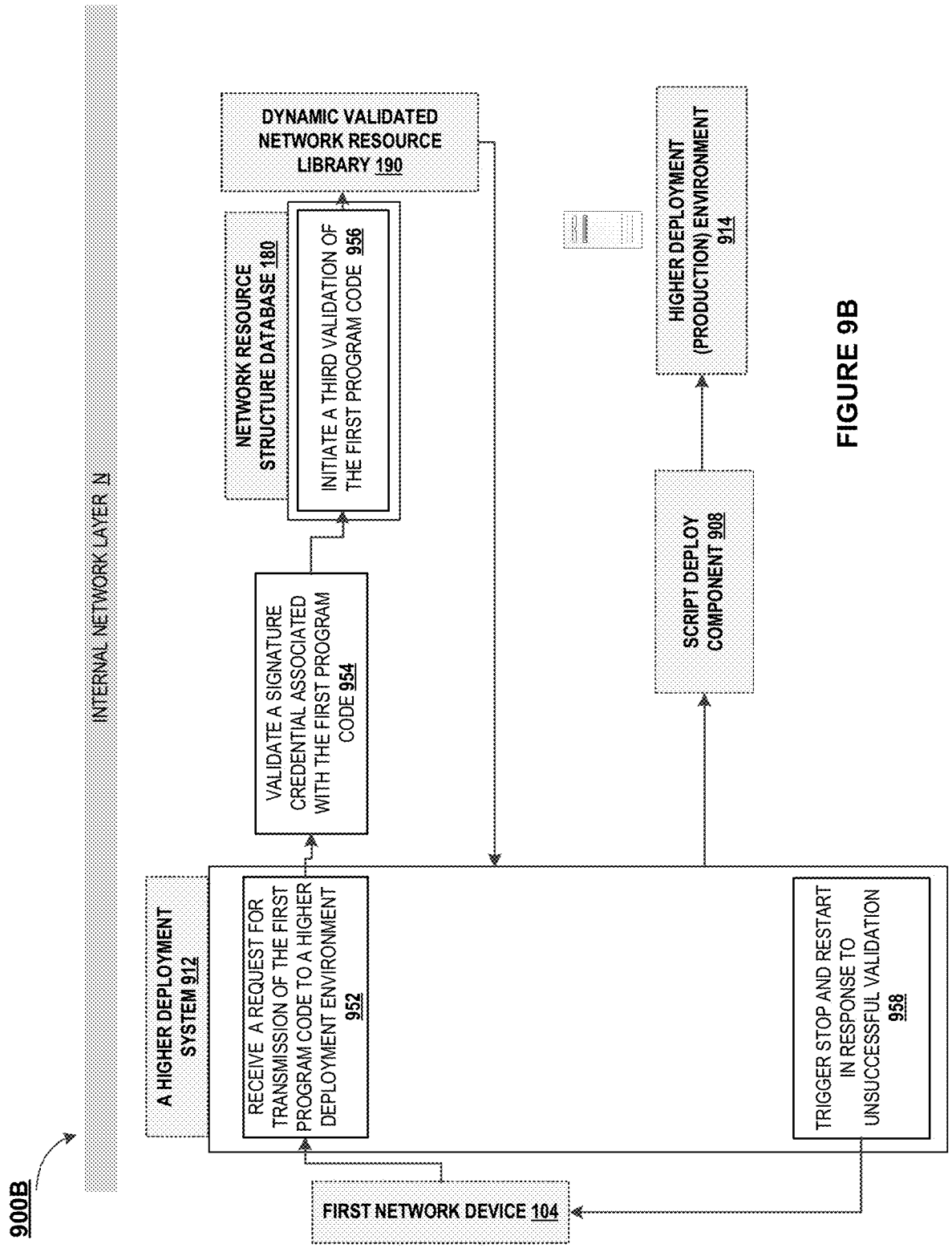

Having thus described embodiments of the invention in general terms, reference will be made to the accompanying drawings, where:

FIG. 1 illustrates a block diagram of the system environment 100 for dynamic network security for a distributed network, in accordance with some embodiments of the invention;

FIG. 2 illustrates a schematic depiction 200 of the network resource structure database and dynamic validated network resource library environment for network resource component tracking and analysis, in accordance with some embodiments of the invention;

FIG. 3A illustrates a high level process flow 300A for network resource component tracking and analysis, in accordance with some embodiments of the invention;

FIG. 3B illustrates a high level process flow 300B for network resource component tracking and analysis, in accordance with some embodiments of the FIG. 3A;

FIG. 4 illustrates a non-limiting illustrative schematic depiction 400 of a plurality of network program resource component data structures, in accordance with some embodiments of the FIGS. 3A-3B;

FIG. 5 illustrates a non-limiting illustrative schematic depiction 500 of a plurality of categorical network program resource component records, in accordance with some embodiments of the FIG. 4;

FIG. 6 illustrates a high level process flow 600 for dynamic adapted security analysis of network resource components, in accordance with some embodiments of the invention;

FIG. 7 illustrates a high level process flow 700 for dynamic quarantine engine integration with a validated network resource component library for network security, in accordance with some embodiments of the invention;

FIG. 8 illustrates a high level process flow 800 for dynamic quarantine engine integration with a validated network resource component library for network security, in accordance with some embodiments of the invention;

FIG. 9A illustrates a high level process flow 900A for security analysis and validation during construction and deployment of dynamic network components, in accordance with some embodiments of the invention; and FIG. 9B illustrates a high level process flow 900B for security analysis and validation during construction and deployment of dynamic network components, in accordance with some embodiments of FIG. 9A.

DETAILED DESCRIPTION OF THE INVENTION

Embodiments of the present invention will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, a "user" may be an individual associated with an enterprise or entity. In some embodiments, a "user" may be an employee (e.g., an associate, a project manager, an IT specialist, a manager, an administrator, an internal operations analyst, or the like) of the entity or enterprises affiliated with the entity, capable of operating the system described herein. In some embodiments, a "user" may be any individual or entity who has a relationship with the enterprise. For purposes of this invention, the terms "user" and "customer" may be used interchangeably. In some embodiments, a "user" may be a customer of the enterprise. In one aspect, a user may be a system performing one or more tasks described herein.

In some embodiments, an "entity" or "enterprise" as used herein may be any institution employing information technology resources. In some embodiments the enterprise may be any institution, group, association, business, financial institution, club, establishment, company, union, authority or the like, employing information technology resources.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. In some embodiments, the graphical user interface may include both graphical elements and text elements.

Typically, an entity or enterprise is associated with a plurality of information technology operational activities. The "information technology operational activities," as referred to herein, may comprise any activities, operations, transactions, technology change activities, technology incidents, actions and events associated with day-to day functioning of an entity, operations and control activities of technology resources of the entity, external networks of the entity, activities performed/initiated by employees, affiliates and customers of the entity, and the like. In some embodiments, the information technology operational activities may comprise operational activities associated with system hardware, operating systems, servers, technology applications, internal networks, storage/databases, user interfaces, authentication operations, middleware, software program products, external networks, software applications, hosting/facilities, business/technology processes, electrical infrastructure, and other technology resources associated with the entity. In some embodiments, the information technology operational activities may be associated with transactional activities of the enterprise, comprising technology changes, technology events, technology maintenance activities, technology incidents, technology problems, technology releases, technology service requests, technology projects, configuration activities, technology resource management activities, vendor transactions and the like.

"Network program resource components", "network resource components", "program resources", or "resources" as used herein may refer to computer programs, applications (e.g., desktop applications, web applications, etc.), deployment executables (including binaries, packages, patches, and other relevant software media), software, firmware, application software, system software, operating systems, device drivers, utilities, server software, embedded software, microcode, plugins, programming tools and applications, and/or other computer programs or software or combinations of the foregoing. Typically, each network program resource component may be associated with technology elements or attributes that may comprise data associated with one or more aspects of the resources. Here, the technology elements or attributes may involve data describing, recording, identifying and/or documenting the resources such as type, version, name, vendor, source data, library, license information, related resources (e.g., linked or downstream applications), data identifying the associated hardware resources (e.g., device identifier, financial resource identifier, resource type information, etc.), and/or the like. That said, in some embodiments, "network program resource components" may refer to hardware components such as servers, technology devices, storage devices, and/or the like, such as those where the software type network resource are stored at or operate on. Moreover, in some embodiments, "resource program codes" as used herein may refer to network program resource components that are currently being developed, built, tested, or deployed within the distributed network.

With advancements in technology, entities have increasingly embraced a multitude of information technology resources such as network program resource components, in an attempt to administer an ever increasing number of operational activities associated with the functioning of the entities. However, these myriad information technology resources are provided at various systems, servers, subsystems, entity divisions, and/or the like, across a distributed network. Typically, one part of the distributed network may not even discern another new resource introduced at another part of the distributed network. Often, any data associated with technology resource in conventional systems is constructed by various systems and stored in disparate, disconnected locations, comprise, incompatible/inconsistent technical languages, incompatible/inconsistent storage method/objects and/or formatting, inconsistent/erroneous data, incomplete data, other data defects, and/or the like. This data may also lack complete information about the network program resource component, or are deficient in data describing specific aspects of the network program resource component required for validity analysis, since this information may be stored as unstructured data in another disparate data location. Conventional systems are inept at evaluating such disparate information, much less correlating unstructured data for constructing each record, determining relationships between the data elements and fundamentally transforming and integrating the unstructured data to construct the categorical records.

Moreover, existing systems and technology are inept at identifying the information technology resources stored at and operating from a multitude devices and locations across the distributed network, much less evaluate these resources to identify vulnerabilities and conflicts with other upstream and downstream resources, thereby potentially imperiling the security of the network. Here, conventional systems can seldom identify or even distinguish between secure and validated resources, and those that are not. Untrusted resources such as software, especially those originating outside the network, serve as a vector for malware or other malicious behavior and may contributes to operational disruption, and may undesirably gran unauthorized entities access to the internal network layers. Conventional systems are typically not capable of network-wide preventative controls which extend to individual deployment executables or instances installed on a network device. Mere malware scanning is inadequate and lacking in providing a network-wide framework, and fails to identify critical vulnerabilities such as compatibility issues across the network. Moreover, in conventional system and technology, because the various instances of a particular technology resource across the distributed network are not distinguishable, any updates implemented are disparate such that one such instance of the resource is updated at one device of the distributed network, but not the rest, thereby leading to compatibility issues and endangering the protection of the network, which may subsequently further trigger malfunctions in operational activities. Thus, there is a need for technical solutions which alleviate the deficiencies of the existing systems and provide novel systems for providing an enhanced network security for a distributed network.

The present invention provides solutions to the foregoing problems in existing technology, alleviates the foregoing deficiencies in existing technology, and provides additional advantages as well. The present invention provides a network-wide framework to enforce and govern the use of validated network program resource components and prevent or strictly control download and installation/execution of unvalidated resources. The present invention provides a novel system that is configured to perform systematic data processing, decipher technical terminology, correct data defects and further configured to perform dynamic correlation, transformation and combination/integration of data stored at a plurality of database locations, for construction of categorical records associated with technology resources. Moreover, the system is structured for dynamic and continuous validation of technology resource, based on most currently available data. These processes are described in detail throughout this disclosure.

As discussed above, "network program resource components", "network resource components", "program resources", or "resources" as used herein may refer to deployment executables (including binaries, packages, patches, and other relevant software media), computer programs, applications (e.g., desktop applications, web applications, etc.), software, firmware, application software, system software, operating systems, device drivers, utilities, server software, embedded software, microcode, plugins, programming tools and applications, and/or other computer programs or software or combinations of the foregoing. Typically, each network program resource component may be associated with technology elements or attributes that may comprise data associated with one or more aspects of the resources. Here, the technology elements or attributes may involve data describing, recording, identifying and/or documenting the resources such as type, version, name, vendor, source data, library, license information, related resources (e.g., linked or downstream applications), data identifying the associated hardware resources (e.g., device identifier, financial resource identifier, resource type information, etc.), and/or the like. Moreover, in some embodiments, "resource program codes" as used herein may refer to network program resource components that are currently being developed, built, tested, or deployed within the distributed network.

Embodiments of the invention are structured for identifying and tracking the numerous network program resource components across a distributed network. The invention further involves analyzing these numerous network program resource components to determine the associated technology elements or attributes. Typically, this data may include descriptive data with words, numbers, phrases and/or sentences about the technology resource. Moreover, this descriptive data, that is stored in various locations, often includes technical terms, syntax, abbreviations, acronyms and terminology that is unique to the system creating/storing the data. Furthermore, the format, construction and context of the information in the data may be unique to the system/user that provided it, and therefore not comprehensible by other systems and not easily compatible for integration with other data associated with the same or similar technology activity that was created by a different system and/or stored at another location.

The invention resolves the foregoing by constructing a network program resource component data structure for each of the identified network program resource component. Here, the network program resource component data structures may comprise a first data structure file format type, such as a data structure type involving in a human-readable format and/or comprise descriptive data (e.g., having a JavaScript Object Notation type). The network program resource component data structures may comprise the identified technology resource as attribute objects therein, where the attribute objects may by discrete components of unstructured data associated with the resource. The unstructured data associated with the data elements may comprise descriptive data, textual data, unformatted data, formatted data, or any other available forms of data/information or a combination of forms. The unstructured data associated with the data elements may be transformed, formatted, encoded, decoded, or otherwise fundamentally altered for constructing records associated with the resource.

The invention may further involve transforming the network program resource component data structures into a plurality of categorical network program resource component records by denormalizing the data structure file format into data fields. As a non-limiting example, system may construct the denormalized records (categorical records) in the form of a data object comprising discrete elements, for example, a row of a spreadsheet comprising information (e.g., transformed unstructured data) associated with various technology elements or attribute objects in various columns and/or a data object/class comprising variables directed to specific technology elements or attribute objects. The invention further involves storing the constructed categorical network program resource component records at a network resource structure database. Although referred to as "a record", it is understood that, in some embodiments the present invention may construct multiple records for each technology resource. In this manner, the invention provides a comprehensive dynamic library of all network program resource components across a distributed network, which not only comprises granular and itemized and linked data associated with each network program resource component, but allows for adapted and easy searching of the database. In some instances, the network resource structure database may take the form of a software bill of materials.

Moreover, the invention involves performing vulnerability analysis of each of the plurality of categorical network program resource component records of the network resource structure database, thereby identifying and designating validated or trusted resources, that may be securely utilized within the distributed network. Here, the invention constructs a dynamic validated network resource library, which is a comprehensive dynamic library of all validated/trusted network program resource components across the distributed network. In some instances, the dynamic validated network resource library may be referred to as a trusted media library.

FIG. 1 illustrates a technology configuration system environment 100 for dynamic network security for a distributed network, in accordance with one embodiment of the present invention. As illustrated in FIG. 1, the technology configuration system 106 is operatively coupled, via a network 101 to technology resources 150, a plurality of technology databases 108, the user system/device 104, and to the third party system 160. The system environment 100 (e.g., excluding the third party system 160) may also be referred to as a distributed network associated with a particular entity, elsewhere in this disclosure. The distributed network may comprise one or more perimeter network layers, surrounding an internal network layer, as will be described later on.

In some embodiments, the network program resource component data structures, and categorical network program resource component records associated with the network program resource components, may be generated by the technology configuration system 106, e.g., in conjunction with the technology resources 150, and/or stored at the network resource structure database 180 and dynamic validated network resource library 190. For example, the technology configuration system 106 may establish operative communication channels with the technology resources 150 such as the system hardware 151, technology devices 152, and/or storage 153, via the network 101 (in some instances, as well as the third party system 160 (such as an open source metaverse project (OSMP) database)). The technology configuration system 106 may then detect a plurality of network program resource components 154 associated with the technology resources 150 as well as any resource program codes 156 currently being developed, built, tested, or deployed thereon, as illustrated by FIG. 1. The technology configuration system 106 may then construct corresponding network program resource component data structures, and categorical network program resource component records and store the same at the network resource structure database 180. Records associated with successfully validated network program resource components 154 and resource program codes 156 may then be stored at the dynamic validated network resource library 190.

In some embodiments, a user system 104 may seek to construct a record for a particular network program resource component 154 associated with one or more specific technology elements. Here, some of the technology elements associated with the particular network program resource component 154 may be provided by users 102 using the user device 104. As described previously, the user 102 may refer to employees, technical subject matter experts, operators and other personnel associated with the entity or affiliates of the entity. Moreover, in some embodiments, a user 102 may review a constructed categorical network program resource component record associated with a particular network program resource component 154, based on satisfying requisite authentication/authorization requirements.

FIG. 1 illustrates a technology configuration system environment 100, in accordance with one embodiment of the present invention, configured for dynamic network security for a distributed network, via (i) network resource component tracking and analysis across a distributed network and construction of a dynamic validated network resource library, (ii) dynamic adapted security analysis of network resource components, (iii) dynamic quarantine engine integration with a validated network resource component library for network security, and (iv) security analysis and validation during construction and deployment of dynamic network components. As illustrated in FIG. 1, the technology configuration system 106 is operatively coupled, via a network 101 to technology resources 150, a plurality of technology databases 108, the user system/device 104, and to the third party system 160. In this way, the technology configuration system 106 can send information to, and receive information from the technology resources 150, the plurality of technology databases 108, the user system 104 and the third party system 160 to provide dynamic network security for a distributed network. FIG. 1 illustrates only one example of an embodiment of the technology configuration system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), near field communication network, audio/radio communication network, ultra-high frequency wireless communication network, or any other type of network or combination of networks. The network 101 may provide for wireline, wireless, or a combination wireline and wireless communication between devices on the network 101.

In some embodiments, the user 102 is an individual associated with the entity. In some embodiments, the user 102 may access the technology configuration system 106 through an interface comprising a webpage or a user technology application 122 (e.g., an application configured for presenting the user interface associated with a user device application API). Hereinafter, "user technology application" is used to refer to an application on the user system 104 of a user, a widget, a webpage accessed through a browser, and the like, and may provide a user interface such as a dynamic validated network resource library interface. In some embodiments the user technology application 122 is a user system application stored on the user system 104. In some embodiments the user technology application may refer to a third party application or a user application stored on a cloud used to access the technology configuration system through a network. In some embodiments, at least a portion of the user technology application 122 is stored on the memory device 140 of the technology configuration system 106. The user 102 may subsequently navigate through the interface, request download or installation of one or more technology resources, provide confirmation, or review presented information, construct, test or deploy resource program codes, and/or the like using a user system 104. In some embodiments, the user device 104 may be referred to as a network device, and the user device 104 may be one of the technology devices 152.

FIG. 1 also illustrates the user system 104. The user system 104 generally comprises a communication device 110, a display device 112, a processing device 114, and a memory device 116. The user system 104 is a computing system that allows a user 102 to interact with the technology configuration system to configure, monitor or control information technology operational activities of the entity. The processing device 114 is operatively coupled to the communication device 110, the display device 112, and the memory device 116. The processing device 114 uses the communication device 110 to communicate with the network 101 and other devices on the network 101, such as, but not limited to the third party system 160 and the technology configuration system 106. As such, the communication device 110 generally comprises a modem, server, or other device for communicating with other systems/devices on the network 101. In some embodiments the network 101 comprises a network of distributed servers. The user system 104 comprises computer-readable instructions 120 stored in the memory device 116/data storage, which in one embodiment includes the computer-readable instructions 120 of the user technology application 122. In this way, a user 102 may communicate with the technology configuration system 106. The user system 104 may be, for example, a computing system, a desktop personal computer, a server system, a mobile system, such as a cellular phone, smart phone, personal data assistant (PDA), laptop, or the like. Although only a single user system 104 is depicted in FIG. 1, the system environment 100 may contain numerous user systems 104.

As further illustrated in FIG. 1, the technology configuration system 106 generally comprises a communication device 136, a processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs or one or more modules, based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the plurality of technology databases 108, the third party system 160 and the user system 104. As such, the communication device 136 generally comprises a modem, server, or other device for communicating with other devices on the network 101.

As further illustrated in FIG. 1, the technology configuration system 106 comprises computer-readable instructions 142 stored in the memory device 140, which in one embodiment includes the computer-readable instructions 142 of a data transformation and security application 144 configured for dynamic network security for a distributed network, via (i) network resource component tracking and analysis across a distributed network and construction of a dynamic validated network resource library, (ii) dynamic adapted security analysis of network resource components, (iii) dynamic quarantine engine integration with a validated network resource component library for network security, and (iv) security analysis and validation during construction and deployment of dynamic network components. The technology configuration system 106 may further comprise computer-readable instructions 142 for a data transformation and security application 144 configured for dynamic correlation, transformation and combination of data stored at a plurality of database locations.

As further illustrated by FIG. 1, the system environment 100 further comprises a plurality of technology databases 108. The plurality of technology databases 108 may be directed to memory storage technology resources, memory locations or data storages comprising an activity databases, data quality databases, cloud storage, and the like, as will be described in detail elsewhere in this disclosure. In some embodiments, the "technology databases" or "database locations" may comprise data sources, storage interfaces, systems and/or the like that are associated with data records, collections or records, and/or other data/information or one or more software types, interfaces and/or data formats. The plurality of technology databases 108 may comprise the network resource structure database 180 and dynamic validated network resource library 190.

The system environment 100 further comprises technology resources 150 comprising system hardware 151, technology devices and applications 152, operating systems, servers, technology applications, internal networks, storage/databases 153, user interfaces, authentication operations, middleware, program products, external networks, hosting/facilities, business/technology processes, and other technology resources associated with the entity. In some embodiments, the technology configuration system 106 communicates with the individual technology resources 150, via established operative communication channels. In this regard, the system 106 may transmit control instructions that cause the technology resources 150 or the databases 108 to perform one or more actions, provide activity data, and the like. The technology resources 150 are typically configured to communicate with one another, other devices operated by the entity, and devices operated by third parties (e.g., customers), such as a third party computing device 160, via a network 101.

FIG. 2 illustrates a schematic depiction 200 of the network resource structure database 180 and dynamic validated network resource library environment 190 for network resource component tracking and analysis, in accordance with some embodiments of the invention. As illustrated herein, a source repository 210 comprises a package management system 202 structured for package management and deployment, in operative communication with a plurality of repositories 240a-240c that may deliver curated packages (e.g., technology resources) to the package management system 202. Here, the first repository 240a may comprise current versions of code and documentation for a particular programing language (e.g., R programming language), the second repository 240b may comprise a repository of software for another programing language (e.g., Python), and the third repository 240c may be associated with a web server software. The source repository 210 may further comprise a metadata repository 206 that may store metadata associated with critical security vulnerability records (as described later on with respect to FIG. 3B), such as common vulnerabilities and exposure (CVE) records.

The system 106 may initiate a periodic synchronization of new libraries via a caching proxy server 230, where the associated data is extracted from the package management system 202 of the source repository via the firewall 220. Moreover, the caching proxy server 230 may extract metadata associated with critical security vulnerability records from the metadata repository 206, via the firewall 220. The caching proxy server 230 may then transmit the packages to a vulnerability scan engine 240. The vulnerability scan engine 240, in conjunction with the dynamic validated network resource library 190, may determine and analyze binaries, artifacts and dependencies associated with the technology resource and further identify vulnerabilities, conflicts and security issues therein. This vulnerability analysis may take the form of the vulnerability analysis 350 described later on with respect to FIG. 3B. The updated security scan results are then transmitted from the vulnerability scan engine 240 to a security metadata repository 264, where the critical security vulnerability records are updated, revised an augmented with the updated security scan results. The mirroring utility component 262 may then retrieve source package and metadata from the caching proxy server 230 and check whether the package passed a security scan and update the security metadata repository 264 accordingly. The mirroring utility component 262 may then transmit the package to a production repository 266, which typically comprises installable packages with all dependencies. The production repository 266 may comprise numerous channel components 286a-268n (channel 1 268a, channel 2 268b, channel 3 268c, . . . , channel N 268n) to facilitate installation of packages to corresponding workbenches or network devices 270a, 270b, 270c. Moreover, usage reports associated with the packages may be provided to the software repository 272.

FIGS. 3A-3B illustrate a high level process flow 300A-300B for network resource component tracking and analysis across a distributed network, in accordance with some embodiments of the invention, which alleviates the deficiencies of and provides improvements to the technology of conventional systems. Some or all of the steps described herein with respect to process flow 300A-300B may be performed by the system 106 (also referred to as "the system"), e.g., via processing device 138 based on executing the computer-readable code 142. Here, the system typically constructs a network resource structure database 180, and a dynamic validated network resource library 190. Moreover, the system is structured for constructing an itemized hierarchical network resource structure database 180 having integral granular technology element specific categorical data structures associated with determined plurality of network program resource components, denormalizing for enhancing data retrieval and processing performance, and providing network security by analyzing and validating the security of the composition of plurality of network program resource components, and detecting and remediating vulnerabilities.

First, as indicated by block 302, the system may detect a plurality of network program resource components associated with a first distributed network. As discussed above, "network program resource components", "network resource components", "program resources", or "resources" as used herein may refer to deployment executables (including binaries, packages, patches, and other relevant software media), computer programs, applications (e.g., desktop applications, web applications, etc.), software, firmware, application software, system software, operating systems, device drivers, utilities, server software, embedded software, microcode, plugins, programming tools and applications, and/or other computer programs or software or combinations of the foregoing, stored at or operating on/from various network devices such as technology resources 150 of the network. Typically, each network program resource component may be associated with technology elements or attributes that may comprise data associated with one or more aspects of the resources. Here, the technology elements or attributes may involve data describing, recording, identifying and/or documenting the resources such as type, version, name, vendor, source data, library, license information, related resources (e.g., linked or downstream applications), data identifying the associated hardware resources (e.g., device identifier, financial resource identifier, resource type information, etc.), and/or the like. Moreover, in some embodiments, "resource program codes" as used herein may refer to network program resource components that are currently being developed, built, tested, or deployed within the distributed network.

Here, in some embodiments, the system may identify network program resource component based on scanning application session logs associated with the network devices such as technology resources 150 of the distributed network. For instance, the system may scan a plurality of application session logs to identify a plurality of first application session logs associated with the first network program resource component of the plurality of network program resource components.

Moreover, in some embodiments, the system regularly updates the source repository 210, as described previously with respect to FIG. 2, and identify network program resource components based on analyzing the updates. Here, the system may synchronize an external source repository via a firewall of the first distributed network. The system may then identify that an update associated with the external source repository is associated with the first network program resource component of the plurality of network program resource components.

Upon detecting the network program resource components, the system may analyze code data associated with each of the plurality of network program resource components, extracted from respective technology resources 150. Here, at block 304, the system may determine, for each of the plurality of network program resource components, a plurality of technology elements associated with the network program resource component. As discussed previously, each network program resource component may be associated with technology elements or attributes that may comprise data associated with one or more aspects of the resources. Here, the technology elements or attributes may involve data describing, recording, identifying and/or documenting the resources such as type, version, name, vendor, source data, library, license information, related resources (e.g., linked or downstream applications), data identifying the associated hardware resources (e.g., device identifier, financial resource identifier, resource type information, etc.), and/or the like.

At block 306, the system may construct, for each of the plurality of network program resource components, an associated network program resource component data structure comprising a plurality of attribute objects. Here, each of determined technology element of the plurality of technology elements associated with the plurality of network program resource components is associated with one or more of the plurality of attribute objects. In some embodiments, the plurality of network program resource component data structures are in a format having data structure objects detailing the specific underlying aspects of the technology resource, with the format allowing for indication of metadata, dependencies, and/or the like. Here, the network program resource component data structures may comprise a first data structure file format type, such as a data structure type involving in a human-readable format and/or comprise descriptive data (e.g., having a JavaScript Object Notation type).

The network program resource component data structures 410 will now be described with respect to a non-limiting illustrative schematic depiction 400 of a plurality of network program resource component data structures of FIG. 4. As discussed above, the system may identify numerous network program resource components 154 across a distributed network. The system may further these numerous network program resource components to determine the associated technology elements or attributes, not just the network program resource component, but also those of any subcomponents such as modules, software portions, etc.

The system constructs a network program resource component data structure 410 for each of the identified network program resource component. For instance, as illustrated by FIG. 4, the system constructs a first network program resource component data structure 410a associated with a first network program resource component, a second network program resource component data structure 410b associated with a second network program resource component, a third network program resource component data structure 410c associated with a second network program resource component, . . . , and/or an Nth network program resource component data structure 410b associated with a Nth network program resource component. Moreover, the system constructs a plurality of attribute objects 420 corresponding to the technology elements/attributes of the network program resource component. For instance, as illustrated by FIG. 4, the system constructs a first plurality of attribute objects 420a for the first network program resource component data structure 410a associated with the first network program resource component, a second plurality of attribute objects 420b for the second network program resource component data structure 410b associated with the second network program resource component, and so on. Moreover, the system further itemizes the attribute objects, by not only the network program resource component itself, but also those of any sub-components such as modules. For instance, the system may detect sub-components or modules of the second network program resource component, as accordingly constructs sub-component specific data structures 430b(i) and 430b(ii), each having data objects 420b corresponding to the attributes or aspects of the sub-components. In this manner, the system comprehensively captures the complexity and interconnectedness of the myriad network program resource components in a distributed network. These network program resource component data structures 410 may be stored at the network resource structure database. In order to drastically reduce the file size and memory storage requirements (e.g., a 50% reduction), and/or to facilitate reduced search and retrieval processing times, and to increase the accuracy of the search and retrieval process, these network program resource component data structures 410 transformed, formatted, encoded, decoded, or otherwise fundamentally altered for constructing categorical network program resource component records.

At block 308 if FIG. 3A, the system may transform the plurality of network program resource component data structures into a plurality of categorical network program resource component records by denormalizing a data structure file format associated with the plurality of network program resource component data structures, that are readily searchable and facilitate easy retrieval of relevant records, in a standardized manner, via a suitable application programing interface (API).

Here, in some embodiments, the system may parse each of the plurality of network program resource component data structures (e.g., 410 described above) to identify the associated plurality of attribute objects (e.g., 420). The system may then determine, for each of the plurality of network program resource component data structures, a plurality of data fields that are required for the associated transformation to categorical network program resource component record. The system may then extract, for each of the plurality of network program resource component data structures, data associated with the plurality of attribute objects from the plurality of network program resource component data structure. Subsequently, the system may construct, for each of the plurality of network program resource component data structures, the associated categorical network program resource component record. Here, each of the plurality of categorical network program resource component records comprises the associated plurality of data fields associated with one or more of the plurality of attribute objects of the associated network program resource component data structure.

The network program resource component data structures 510 will now be described with respect to a non-limiting illustrative schematic depiction 500 of a plurality of categorical network program resource component records of FIG. 5. As depicted, the system may construct a plurality of categorical network program resource component records 510 comprising the associated plurality of data fields 520 associated with one or more of the plurality of attribute objects of the associated network program resource component data structure. Referring to FIGS. 4-5, the system may transform the first network program resource component data structure 410a associated with the first network program resource component into a first categorical network program resource component record ("Record 1"). Here, the system may transform the first plurality of attribute objects 420a for the first network program resource component data structure 410a into a plurality of data fields 1.1, 1.2, . . . , 1.K for the Record 1. Similarly, the system may transform the second network program resource component data structure 410b associated with the second network program resource component into one or more second categorical network program resource component records. For instance, the system may construct separate categorical network program resource component records ("Record 2" and "Record 3") for the sub-components 430b(i) and 430b(ii) respectively, having transformed corresponding of attribute objects 420b into a plurality of data fields 2.1, 2.2, . . . , 2.K for the Record 2, and plurality of data fields 3.1, 3.2, . . . , 3.K for the Record 3. Similarly, the system may construct an Mth categorical network program resource component record for another network program resource component having a plurality of data fields M.1, M.2, . . . , M.K for the Record M. Moreover, one or more of the columns of the fields may indicate dependency relationships between technology resources. Here, at least one first data field of the plurality of data fields of the first categorical network program resource component record may comprises hierarchical dependency technology pointers to at least one second categorical network program resource component record of the plurality of categorical network program resource component records having a dependency relationship with the first categorical network program resource component record.

In some embodiments, the plurality of data fields are constructed in a standardized and categorical manner, to allow for uniform data operations. The system may map each of the plurality of network program resource component data structures to a plurality of technology identifiers retrieved from a categorical context database. Typically, the plurality of technology identifiers comprises the data fields of various categories required for a categorical record, the content of data fields required for a categorical record, format of the content, exhaustive keywords/identifier lists associated with technology resources/aspects classified into categories, and the like. The categorical context database may further comprise a plurality of technology language context rules that govern how the data in the network program resource component data structures should be mapped to categories of data fields, thereby creating a context for a record. Next the system may associate, for each of the plurality of network program resource component data structures, the extracted data associated with the plurality of attribute objects from the plurality of network program resource component data structure with the plurality of technology identifiers. Here, the system may determine technology identifier data to be associated with each of the required data fields. For example, the system may determine that format of the identifier data associated with a first application comprises a type of application followed by first two letters of the name/maker of the application, followed by a version code and a unique alphanumeric code. As another example, the system may determine that a format for the first physical location comprises a unique alphanumeric code. As yet another example, the system may determine that a particular type of first technology action is associated with a symbolic code. The system may then transform the attribute object data comprising words/phrases to the required formatted data comprising technology identifier data in the appropriate data fields. In this manner, the system constructs the plurality of data fields with uniform and compatible technology identifiers The system may subsequently store the denormalized plurality of categorical network program resource component records associated with the plurality of network program resource component data structures, in a network resource structure database 180, as indicated by block 310 of FIG. 3A.

As depicted by FIG. 3B, the system may perform vulnerability analysis of each of the plurality of categorical network program resource component records of the plurality of network program resource components, as indicated by block 312. In some embodiments, the vulnerability analysis or validation of the network program resource components is performed to determine whether the particular resource is trustworthy or whether it is likely to cause any security issues, compatibility issues, malfunctions, and/or the like. In some embodiments, the vulnerability analysis takes a four prong approach 350 involving (i) critical security vulnerability validation as indicated by block 314, (ii) scan success validation as indicated by block 316, (iii) source validation as indicated by block 318, and/or (iv) component file validation as indicated by block 320. In some embodiments, a particular network program resource component is determined to be validated and trustworthy after successful validation of each of the four validation steps of blocks 314-320. In some embodiments, an unsuccessful validation of any of the four validation steps of blocks 314-320 may trigger a particular network program resource component to have an unsuccessful validation. Moreover, a previously successfully validated network program resource component may be dynamically determined to be unsuccessfully validated if either of the validation steps of blocks 314-320 later become unvalidated, e.g., due to updates to the source, changes to critical security metadata, and/or the like. That said, it is understood that more or fewer validation steps than the validation steps of blocks 314-320 may be employed in other embodiments.

The system may perform a critical security vulnerability validation, as indicated by block 314. Here, the system may determine whether any network program resource component, or portion thereof, or any version thereof, has a critical common vulnerabilities and exposure (CVE) record associated with it. Specifically, the system may determine whether a version associated with the first network program resource component is associated with a critical security vulnerability record (e.g., CVE record). The system may determine a successful validation of the first network program resource component in response to determining that the version of the first network program resource component is not associated with any the critical security vulnerability record. On the other hand, the system may determine an unsuccessful validation of the first network program resource component in response to determining that the version of the first network program resource component is associated with the critical security vulnerability record.

As discussed above, the system may regularly or periodically update the vulnerability analysis to determine whether new circumstances would render a prior successfully validated resource, unsuccessfully validated at the current time. Here, in some embodiments, the system may determine whether a version associated with the first network program resource component is associated with one or more critical security vulnerability records. Next, the system may determining a successful validation of the first network program resource component at a first time interval, in response to determining that the version of the first network program resource component is not associated with the one or more critical security vulnerability records. The system may then initiate an update of the one or more critical security vulnerability records. The system may determine, dynamically, an unsuccessful validation of the first network program resource component at a second time interval succeeding the first time interval, in response to determining that the version of the first network program resource component is associated with the updated one or more critical security vulnerability records. Alternatively, the system may retain the successful validation when the version of the first network program resource component is not associated with the updated one or more critical security vulnerability records.

The system may perform scan success validation, as indicated by block 316. Here, the system may determine that a particular resource is unsuccessfully validated if the resource cannot be scanned, or if a version or sub-version thereof cannot be scanned. Here, the system may determine whether a scan of a version associated with the first network program resource component is successful. Subsequently, the system may determine an unsuccessful validation of the first network program resource component in response to determining that the scan of the version of the first network program resource component is unsuccessful. Alternatively, the system may determine a successful validation if the resource can be properly scanned in accordance with security requirements. Again, the system may periodically or regularly repeat the scan successful validation to dynamically identify validation and trustworthiness when the resources constantly change and evolve due to their inherent transient nature.

The system may perform source validation, as indicated by block 318. Here, the system may determine whether the technology resources, or versions or sub-versions thereof, are novel and unknown to the distributed network, and to other trusted databases and networks, and may determine unsuccessful validation if the system is not able to identify licenses, contract, or other validating credentials. Here, the system may determine whether a source entity associated with the first network program resource component is associated with the one or more categorical network program resource component records of the dynamic validated network resource library 190. The system may determine an unsuccessful validation of the first network program resource component in response to determining that the source entity of the first network program resource component does not match the one or more categorical network program resource component records of the dynamic validated network resource library 190. Conversely, the system may determine a successful validation upon identifying a match with a validated/trusted resource. Again, the system may periodically or regularly repeat the source validation to dynamically identify validation and trustworthiness when the resources constantly change and evolve due to their inherent transient nature.

The system may perform component file validation as indicated by block 320. Here, the system may determine the validation based on whether the provenance, e.g., source entity or vendor, associated with the resource is validated. Here, the system may determine whether a version of the first network program resource component is associated with a component file (having trusted or previously validated source entities or vendors). The system may determine an unsuccessful validation of the first network program resource component in response to determining that the version of the first network program resource component does not match the component file, and alternatively determine a successful validation upon identifying a match. The system may periodically or regularly repeat the source validation component file validation to dynamically identify validation and trustworthiness when the resources constantly change and evolve due to their inherent transient nature.

Subsequently, at block 322, in response to successful validation of a first network program resource component of the plurality of network program resource components, the system may insert a first categorical network program resource component record associated with the first network program resource component, of the plurality of categorical network program resource component records at a dynamic validated network resource library 190.

A record retrieval process will now be described. Initially, the system may receive a retrieval request for retrieving one or more categorical network program resource component records from the network resource structure database 180 from a first network device. In response, the system may construct a retrieval rule based on determining one or more data fields associated with the retrieval request. Here, the system may determine the retrieval rule based determining technology identifiers comprising categorical keywords to be associated with the retrieval rule based on the determined context. Subsequently, the system may retrieve one or more records of the plurality of categorical network program resource component records based on the retrieval rule, and transmit the one or more records of the plurality of categorical network program resource component records to the first network device.

FIG. 6 illustrates a high level process flow 600 for dynamic adapted security analysis of network resource components, in accordance with some embodiments of the invention. Process flow 600 is structured for providing proactive network security by dynamically analyzing entering network resource components for vulnerabilities, establishing adapted validation thresholds and mitigation actions, and preventing unsuccessfully validated network resource components in a distributed network. Some or all of the steps associated with the process flow 600 may be performed by the system 106, either alone or in combination with the technology resources 150, plurality of technology databases 108, user device 104 and other devices/systems. In some embodiments, the system 106 comprises at least one processor 138 configured to execute computer readable instructions associated with the data transformation application 144, for one or more steps of process flow 600. Executing the instructions in the data transformation and security application 144 (and/or other modules within the technology configuration system 106) may cause the system 106, hereinafter referred to as "the system" to perform one or more steps described below with respect to process flow 600.

As illustrated, the distributed network may comprise a perimeter network layer A (such as a DMZ network layer) surrounding an internal network layer N, which is an internal, private network of the entity. The perimeter network layer A functions as an isolated network forming a barrier between an external network 10 (e.g., internet) and the internal network layer N. Block 602 of process flow 600, illustrates that the system may detect, via a network proxy component 12, an incoming file transfer associated with a first network program resource component from the external network 10, at a first distributed network initiated by a first user at first network device of the first distributed network. As indicated by block 604, in response to determining, via the network proxy component 12, that a file attribute data element associated with the first network program resource component is associated with a predetermined file type, the system may block the incoming file transfer associated with the first network program resource component at the first distributed network. In some embodiments, the file attribute data element is associated with a file name of the first network program resource component. Here, the system may block certain file types, based on the file extension in the file names, such as those indicating executable files. As a non-limiting example, the system may block exe, jar, ear, war, cab, lib, and/or other file types. Here, determining that the file attribute data element associated with the first network program resource component is associated with the predetermined file type comprises determining that the first network program resource component is an executable type file. The system may then automatically redirect a current interface displayed at the first network device 104 to a dynamic validated network resource library interface associated with a dynamic validated network resource library 190, indicating that the attempted download has been blocked and requesting an input whether the download is still to be performed.

The system may receive, via the dynamic validated network resource library interface, a request for the first network program resource component from the first user via the first network device 104, as indicated by block 606, confirming that whether the download is still to be performed. Subsequently, at block 608, the system may download the first network program resource component to a network quarantine component associated with the first distributed network. Next, at block 610 the system may initiate, via the network quarantine component 14, dynamic validation of the first network program resource component based on at least one or more categorical network program resource component records associated with the dynamic validated network resource library 190.

At block 612, the system may perform dynamic validation of the first network resource component. In some embodiments, the dynamic validation involves integrating the dynamic validated network resource library 190 into the validation process. Here, the system may first construct a retrieval rule associated with the first network program resource component based on determining one or more data fields associated with the network program resource component. The system may retrieve one or more first categorical network program resource component records of a plurality of categorical network program resource component records based on the retrieval rule from the dynamic validated network resource library 190. Next, the system may parse the one or more first categorical network program resource component records to determine whether the one or more first categorical network program resource component records match the first network program resource component. Here, in response to determining that the one or more first categorical network program resource component records match the first network program resource component (i.e., indicating that the resource matches a previously validated and trusted resource), the system may determine a successful validation, and allow installation of the first network program resource component at the first network device. Alternatively, in response to determining that the one or more first categorical network program resource component records do not match the first network program resource component, the system may determine an unsuccessful validation and prevent installation of the first network program resource component at the first network device.

In other embodiments, e.g., in the instances where the first resource was not matched with previously validated resources, this dynamic validation may be substantially similar to the validation process 350 described previously, involving (i) critical security vulnerability validation, (ii) scan success validation, (iii) source validation, and/or (iv) component file validation.

The system may perform a critical security vulnerability validation. Here, the system may determine whether any network program resource component, or portion thereof, or any version thereof, has a critical common vulnerabilities and exposure (CVE) record associated with it. Specifically, the system may determine whether a version associated with the first network program resource component is associated with a critical security vulnerability record (e.g., CVE record). The system may determine a successful validation of the first network program resource component in response to determining that the version of the first network program resource component is not associated with any the critical security vulnerability record. On the other hand, the system may determine an unsuccessful validation of the first network program resource component in response to determining that the version of the first network program resource component is associated with the critical security vulnerability record.

As discussed above, the system may regularly or periodically update the vulnerability analysis to determine whether new circumstances would render a prior successfully validated resource, unsuccessfully validated at the current time. Here, in some embodiments, the system may determine whether a version associated with the first network program resource component is associated with one or more critical security vulnerability records. Next, the system may determining a successful validation of the first network program resource component at a first time interval, in response to determining that the version of the first network program resource component is not associated with the one or more critical security vulnerability records. The system may then initiate an update of the one or more critical security vulnerability records. The system may determine, dynamically, an unsuccessful validation of the first network program resource component at a second time interval succeeding the first time interval, in response to determining that the version of the first network program resource component is associated with the updated one or more critical security vulnerability records. Alternatively, the system may retain the successful validation when the version of the first network program resource component is not associated with the updated one or more critical security vulnerability records.

The system may perform scan success validation. Here, the system may determine that a particular resource is unsuccessfully validated if the resource cannot be scanned, or if a version or sub-version thereof cannot be scanned. Here, the system may determine whether a scan of a version associated with the first network program resource component is successful. Subsequently, the system may determine an unsuccessful validation of the first network program resource component in response to determining that the scan of the version of the first network program resource component is unsuccessful. Alternatively, the system may determine a successful validation if the resource can be properly scanned in accordance with security requirements. Again, the system may periodically or regularly repeat the scan successful validation to dynamically identify validation and trustworthiness when the resources constantly change and evolve due to their inherent transient nature.

The system may perform source validation. Here, the system may determine whether the technology resources, or versions or sub-versions thereof, are novel and unknown to the distributed network, and to other trusted databases and networks, and may determine unsuccessful validation if the system is not able to identify licenses, contract, or other validating credentials. Here, the system may determine whether a source entity associated with the first network program resource component is associated with the one or more categorical network program resource component records of the dynamic validated network resource library 190. The system may determine an unsuccessful validation of the first network program resource component in response to determining that the source entity of the first network program resource component does not match the one or more categorical network program resource component records of the dynamic validated network resource library 190. Conversely, the system may determine a successful validation upon identifying a match with a validated/trusted resource. Again, the system may periodically or regularly repeat the source validation to dynamically identify validation and trustworthiness when the resources constantly change and evolve due to their inherent transient nature.

The system may perform component file validation. Here, the system may determine the validation based on whether the provenance, e.g., source entity or vendor, associated with the resource is validated. Here, the system may determine whether a version of the first network program resource component is associated with a component file (having trusted or previously validated source entities or vendors). The system may determine an unsuccessful validation of the first network program resource component in response to determining that the version of the first network program resource component does not match the component file, and alternatively determine a successful validation upon identifying a match. The system may periodically or regularly repeat the source validation component file validation to dynamically identify validation and trustworthiness when the resources constantly change and evolve due to their inherent transient nature.

As indicated by block 614, the system may periodically revalidate categorical network program resource component records. In response to a successful validation of the first network program resource component, construct a transmission of the downloaded first network program resource component to the first network device such that the first network program resource component cannot be executed at the first network device when the dynamic validated network resource library 190 does not comprise the first network program resource component, as indicated by block 616. At block 618, the system may initiate the transmission of the downloaded first network program resource component to the first network device 104. Here, the system may modify the installation processes to be compatible with the respective channel such as technology devices 152, servers 151A, and/or build/code construction system 151B, based on the location where the resource is required to be installed.

Here, prior to installation, the system verifies the download and install permissions of the user of the network device 104, and modifies the user permissions dynamically to enhance security, in some embodiments. First, the system may determine whether the first user is associated with a download permission at the first network device. The system may then determine whether the first user is associated with an install permission at the first network device. In response to determining that the first user is associated with the download permission and the install permission at the first network device, the system may revoke the download permission or the install permission of the first user at the first network device.

In some embodiments, in response to determining, via the network proxy component, that a file attribute data element associated with a second network program resource component is associated with the predetermined file type, the system may block the incoming file transfer associated with the second network program resource component at the first distributed network, similar to the manner described above. In response to a request for the second network program resource component from a second network device, the system may download the second network program resource component to the network quarantine component associated with the first distributed network. In response to an unsuccessful validation of the first network program resource component, the system may prevent transmission of the second network program resource into the first distributed network.

FIG. 7 illustrates a high level process flow 700 for dynamic quarantine engine integration with a validated network resource component library for network security, in accordance with some embodiments of the invention. Process flow 700 is structured for real time deconstruction of incoming data and dynamic analysis of deconstructed components, and preventing unsuccessfully validated network resource components in a distributed network. Some or all of the steps associated with the process flow 700 may be performed by the system 106, either alone or in combination with the technology resources 150, plurality of technology databases 108, user device 104 and other devices/systems. In some embodiments, the system 106 comprises at least one processor 138 configured to execute computer readable instructions associated with the data transformation application 144, for one or more steps of process flow 700. Executing the instructions in the data transformation and security application 144 (and/or other modules within the technology configuration system 106) may cause the system 106, hereinafter referred to as "the system" to perform one or more steps described below with respect to process flow 700.

As illustrated, the distributed network may comprise a perimeter network layer A and perimeter network layer B (such as a DMZ network layers) surrounding an internal network layer N, which is an internal, private network of the entity. The perimeter network layers A and B function as isolated networks forming a barrier between an external network 10 (e.g., internet) and the internal network layer N. In particular, the process flow 700 depicts the embodiment where the first network device 104 is external to the perimeter network layers A and B as well as the internal network layer B, and the first network device 104 is utilized for accessing or searching the external network 10. Moreover, here the dynamic quarantine validation library engine 16 integrates and connects quarantine functions with that of the dynamic validation network resource library 190, thereby allowing for real time deconstruction of incoming data and dynamic analysis of deconstructed components.

The system may detect, via a network proxy component 12, an incoming file transfer associated with a first network program resource component at a first distributed network initiated by a first user at first network device 104 of the first distributed network. In response to determining, via the network proxy component, that a file attribute data element associated with the first network program resource component is associated with a predetermined file type, (i) block the incoming file transfer associated with the first network program resource component at the first distributed network, and (ii) automatically redirect a current interface displayed at the first network device to a dynamic validated network resource library 190 interface associated with a dynamic validated network resource library 190, as indicated by block 702. In some embodiments, the file attribute data element is associated with a file name of the first network program resource component. Here, the system may block certain file types, based on the file extension in the file names, such as those indicating executable files. As a non-limiting example, the system may block exe, jar, ear, war, cab, lib, and/or other file types. Here, determining that the file attribute data element associated with the first network program resource component is associated with the predetermined file type comprises determining that the first network program resource component is an executable type file. The system may then automatically redirect a current interface displayed at the first network device 104 to a dynamic validated network resource library interface associated with a dynamic validated network resource library 190, indicating that the attempted download has been blocked and requesting an input whether the download is still to be performed.

Next, as indicated by block 704, the system may determine whether the first network program resource component matches the dynamic validated network resource library 190, e.g., to verify whether the first network program resource component was previously determined to be successfully validated and trusted. In the event that that the system determines that the first network program resource component matches the dynamic validated network resource library 190, the system may preset instructions for downloading the first network program resource component from the dynamic validated network resource library 190.

In response to determining that the first network program resource component does not match the dynamic validated network resource library 190, the system may download, via a perimeter network layer B of a first distributed network, a first network program resource component from an external source location to a dynamic quarantine validation library engine 16 associated with the first distributed network, as indicated by block 706.

At block 708, the system may initiate, via the dynamic quarantine validation library engine 16, a first dynamic deconstructed validation of the first network program resource component. Here, the engine 16 is structured to dynamically decompose incoming resource data into component parts, or decompile into segments. This typically involves splitting the first network program resource component into a plurality of program resource component portions, and validating each of the plurality of program resource component portions individually based on at least one or more categorical network program resource component records associated with the dynamic validated network resource library 190. Here, the system may apply the validation process 350 involving (i) critical security vulnerability validation, (ii) scan success validation, (iii) source validation, and/or (iv) component file validation, described previously, to every component portion individually.

The system may perform a critical security vulnerability validation. Here, the system may determine whether any network program resource component, or portion thereof, or any version thereof, has a critical common vulnerabilities and exposure (CVE) record associated with it. Specifically, the system may determine whether a version associated with at least one of the plurality of program resource component portions of the first network program resource component is associated with a critical security vulnerability record (e.g., CVE record). The system may determine a successful validation of the first network program resource component in response to determining that the version of the first network program resource component is not associated with any the critical security vulnerability record. On the other hand, the system may determine an unsuccessful validation of the first network program resource component in response to determining that the version of the at least one of the plurality of program resource component portions of the first network program resource component is associated with the critical security vulnerability record.

As discussed above, the system may regularly or periodically update the vulnerability analysis to determine whether new circumstances would render a prior successfully validated resource, unsuccessfully validated at the current time. Here, in some embodiments, the system may determine whether a first version associated with a first program resource component portion of the plurality of program resource component portions of the first network program resource component is associated with one or more critical security vulnerability records. Next, the system may determining a successful first dynamic deconstructed validation of the first network program resource component at a first time interval, in response to determining that the first version is not associated with the one or more critical security vulnerability records. The system may then initiate an update of the one or more critical security vulnerability records. The system may determine, dynamically, an unsuccessful validation of the first network program resource component at a second time interval succeeding the first time interval, in response to determining that a second version associated with a second program resource component portion of the plurality of program resource component portions of the first network program resource component is associated with the updated one or more critical security vulnerability records.

The system may perform scan success validation. Here, the system may determine that a particular resource is unsuccessfully validated if the resource cannot be scanned, or if a version or sub-version thereof cannot be scanned. Here, the system may determine whether a scan of a version associated with at least one of the plurality of program resource component portions of the first network program resource component is successful. Subsequently, the system may determine an unsuccessful validation of the first network program resource component in response to determining that the scan of the version of the at least one of the plurality of program resource component portions of the first network program resource component is unsuccessful. Alternatively, the system may determine a successful validation if the resource can be properly scanned in accordance with security requirements. Again, the system may periodically or regularly repeat the scan successful validation to dynamically identify validation and trustworthiness when the resources constantly change and evolve due to their inherent transient nature.

The system may perform source validation. Here, the system may determine whether the technology resources, or versions or sub-versions thereof, are novel and unknown to the distributed network, and to other trusted databases and networks, and may determine unsuccessful validation if the system is not able to identify licenses, contract, or other validating credentials. Here, the system may determine whether a source entity associated with at least one of the plurality of program resource component portions of the first network program resource component is associated with the one or more categorical network program resource component records of the dynamic validated network resource library 190. The system may determine an unsuccessful validation of the first network program resource component in response to determining that the source entity of the at least one of the plurality of program resource component portions of the first network program resource component does not match the one or more categorical network program resource component records of the dynamic validated network resource library 190. Conversely, the system may determine a successful validation upon identifying a match with a validated/trusted resource. Again, the system may periodically or regularly repeat the source validation to dynamically identify validation and trustworthiness when the resources constantly change and evolve due to their inherent transient nature.

The system may perform component file validation. Here, the system may determine the validation based on whether the provenance, e.g., source entity or vendor, associated with the resource is validated. Here, the system may whether a version of at least one of the plurality of program resource component portions of the first network program resource component is associated with a component file (having trusted or previously validated source entities or vendors). The system may determine an unsuccessful validation of the first network program resource component in response to determining that the version of the at least one of the plurality of program resource component portions of the first network program resource component does not match the component file, and alternatively determine a successful validation upon identifying a match. The system may periodically or regularly repeat the source validation component file validation to dynamically identify validation and trustworthiness when the resources constantly change and evolve due to their inherent transient nature.

At block 710, in response to a successful first dynamic deconstructed validation of the first network program resource component, the system may construct a first categorical network program resource component record associated with the first network component at network resource structure database 180, in a manner similar to that described previously with respect to FIGS. 3A-5. The system may then transmit the first categorical network program resource component record associated with the first network component to the dynamic quarantine validation library engine 16, as indicated by block 712.

The system may then initiate, via the dynamic quarantine validation library engine 16, a second dynamic deconstructed validation of the first categorical network program resource component record associated with the first network component, as indicated by block 714, in a manner similar to the validation process of block 708. In this manner, the system may apply current validation standards, that may have changes since the first validation.

At block 716, in response to successful validation of a second dynamic deconstructed validation of the first categorical network program resource component, the system may then insert the first categorical network program resource component record associated with the first network program resource component at a dynamic validated network resource library 190. The system may transmit the downloaded first network program resource component to a validated component repository, as indicated by block 718.

Upon unsuccessful validation at block 708, e.g., due to failure in trust scans, the system may transmit an unsuccessful validation notification to the first network device 104, as indicated by block 720.

FIG. 8 illustrates a high level process flow 800 for dynamic quarantine engine integration with a validated network resource component library for network security, in accordance with some embodiments of the invention. Process flow 800 is structured for real time deconstruction of incoming data and dynamic analysis of deconstructed components, and preventing unsuccessfully validated network resource components in a distributed network. Some or all of the steps associated with the process flow 800 may be performed by the system 106, either alone or in combination with the technology resources 150, plurality of technology databases 108, user device 104 and other devices/systems. In some embodiments, the system 106 comprises at least one processor 138 configured to execute computer readable instructions associated with the data transformation application 144, for one or more steps of process flow 800. Executing the instructions in the data transformation and security application 144 (and/or other modules within the technology configuration system 106) may cause the system 106, hereinafter referred to as "the system" to perform one or more steps described below with respect to process flow 800.

As illustrated, the distributed network may comprise a perimeter network layer A and perimeter network layer B (such as a DMZ network layers) surrounding an internal network layer N, which is an internal, private network of the entity. The perimeter network layers A and B function as isolated networks forming a barrier between an external network 10 (e.g., internet) and the internal network layer N. In particular, the process flow 800 depicts the embodiment where the first network device 104 is within the internal network layer B, and the first network device 104 is utilized for accessing or searching the external network 10. Moreover, here the dynamic quarantine validation library engine 16 integrates and connects quarantine functions with that of the dynamic validation network resource library 190, thereby allowing for real time deconstruction of incoming data and dynamic analysis of deconstructed components.

As indicated by block 802, the system may receive, at the dynamic validated network resource library 190, a request for the first network program resource component from the first user via the first network device 104. In response, the system may validate the predetermined device credential associated with the first network device 104, to determine whether the device is authorized for this request, as indicated by block 804.

In response to determining that the first network program resource component does not match the dynamic validated network resource library 190, the system may download, via a perimeter network layer B of a first distributed network, a first network program resource component from an external source location to a dynamic quarantine validation library engine 16 associated with the first distributed network, as indicated by block 806.

At block 808, the system may initiate, via the dynamic quarantine validation library engine 16, a first dynamic deconstructed validation of the first network program resource component. Here, the engine 16 is structured to dynamically decompose incoming resource data into component parts, or decompile into segments. This typically involves splitting the first network program resource component into a plurality of program resource component portions, and validating each of the plurality of program resource component portions individually based on at least one or more categorical network program resource component records associated with the dynamic validated network resource library 190. Here, the system may apply the validation process 350 involving (i) critical security vulnerability validation, (ii) scan success validation, (iii) source validation, and/or (iv) component file validation, described previously, to every component portion individually.

The system may perform a critical security vulnerability validation. Here, the system may determine whether any network program resource component, or portion thereof, or any version thereof, has a critical common vulnerabilities and exposure (CVE) record associated with it. Specifically, the system may determine whether a version associated with at least one of the plurality of program resource component portions of the first network program resource component is associated with a critical security vulnerability record (e.g., CVE record). The system may determine a successful validation of the first network program resource component in response to determining that the version of the first network program resource component is not associated with any the critical security vulnerability record. On the other hand, the system may determine an unsuccessful validation of the first network program resource component in response to determining that the version of the at least one of the plurality of program resource component portions of the first network program resource component is associated with the critical security vulnerability record.

As discussed above, the system may regularly or periodically update the vulnerability analysis to determine whether new circumstances would render a prior successfully validated resource, unsuccessfully validated at the current time. Here, in some embodiments, the system may determine whether a first version associated with a first program resource component portion of the plurality of program resource component portions of the first network program resource component is associated with one or more critical security vulnerability records. Next, the system may determining a successful first dynamic deconstructed validation of the first network program resource component at a first time interval, in response to determining that the first version is not associated with the one or more critical security vulnerability records. The system may then initiate an update of the one or more critical security vulnerability records. The system may determine, dynamically, an unsuccessful validation of the first network program resource component at a second time interval succeeding the first time interval, in response to determining that a second version associated with a second program resource component portion of the plurality of program resource component portions of the first network program resource component is associated with the updated one or more critical security vulnerability records.

The system may perform scan success validation. Here, the system may determine that a particular resource is unsuccessfully validated if the resource cannot be scanned, or if a version or sub-version thereof cannot be scanned. Here, the system may determine whether a scan of a version associated with at least one of the plurality of program resource component portions of the first network program resource component is successful. Subsequently, the system may determine an unsuccessful validation of the first network program resource component in response to determining that the scan of the version of the at least one of the plurality of program resource component portions of the first network program resource component is unsuccessful. Alternatively, the system may determine a successful validation if the resource can be properly scanned in accordance with security requirements. Again, the system may periodically or regularly repeat the scan successful validation to dynamically identify validation and trustworthiness when the resources constantly change and evolve due to their inherent transient nature.

The system may perform source validation. Here, the system may determine whether the technology resources, or versions or sub-versions thereof, are novel and unknown to the distributed network, and to other trusted databases and networks, and may determine unsuccessful validation if the system is not able to identify licenses, contract, or other validating credentials. Here, the system may determine whether a source entity associated with at least one of the plurality of program resource component portions of the first network program resource component is associated with the one or more categorical network program resource component records of the dynamic validated network resource library 190. The system may determine an unsuccessful validation of the first network program resource component in response to determining that the source entity of the at least one of the plurality of program resource component portions of the first network program resource component does not match the one or more categorical network program resource component records of the dynamic validated network resource library 190. Conversely, the system may determine a successful validation upon identifying a match with a validated/trusted resource. Again, the system may periodically or regularly repeat the source validation to dynamically identify validation and trustworthiness when the resources constantly change and evolve due to their inherent transient nature.

The system may perform component file validation. Here, the system may determine the validation based on whether the provenance, e.g., source entity or vendor, associated with the resource is validated. Here, the system may whether a version of at least one of the plurality of program resource component portions of the first network program resource component is associated with a component file (having trusted or previously validated source entities or vendors). The system may determine an unsuccessful validation of the first network program resource component in response to determining that the version of the at least one of the plurality of program resource component portions of the first network program resource component does not match the component file, and alternatively determine a successful validation upon identifying a match. The system may periodically or regularly repeat the source validation component file validation to dynamically identify validation and trustworthiness when the resources constantly change and evolve due to their inherent transient nature.

At block 810, in response to a successful first dynamic deconstructed validation of the first network program resource component, the system may construct a first categorical network program resource component record associated with the first network component at network resource structure database 180, in a manner similar to that described previously with respect to FIGS. 3A-5. The system may then transmit the first categorical network program resource component record associated with the first network component to the dynamic quarantine validation library engine 16, as indicated by block 812.

The system may then initiate, via the dynamic quarantine validation library engine 16, a second dynamic deconstructed validation of the first categorical network program resource component record associated with the first network component, as indicated by block 814, in a manner similar to the validation process of block 808. In this manner, the system may apply current validation standards, that may have changes since the first validation.

At block 816, in response to successful validation of a second dynamic deconstructed validation of the first categorical network program resource component, the system may then insert the first categorical network program resource component record associated with the first network program resource component at a dynamic validated network resource library 190. The system may transmit the downloaded first network program resource component to a validated component repository, as indicated by block 818. Upon unsuccessful validation at block 808, e.g., due to failure in trust scans, the system may transmit an unsuccessful validation notification to the first network device 104, as indicated by block 820.

FIGS. 9A-9B illustrate a high level process flow 900A-900B for security analysis and validation during construction and deployment of dynamic network components, in accordance with some embodiments of the invention. Process flow 900A-900B is structured for identifying and remediating defects in a first resource program code being built at an internal network layer of the first distributed network, in real-time, and validating the first resource program code at both a lower deployment environment and a higher deployment environment. Some or all of the steps associated with the process flow 900A-900B may be performed by the system 106, either alone or in combination with the technology resources 150, plurality of technology databases 108, user device 104 and other devices/systems. In some embodiments, the system 106 comprises at least one processor 138 configured to execute computer readable instructions associated with the data transformation application 144, for one or more steps of process flow 900A-900B. Executing the instructions in the data transformation and security application 144 (and/or other modules within the technology configuration system 106) may cause the system 106, hereinafter referred to as "the system" to perform one or more steps described below with respect to process flow 900A-900B.

As indicated by block 922, the system may detect, via a lower deployment environment system 902, transmission of a first resource program code to a quality control testing system. Here, a user or developer may have initiated a code merge or promotion to quality assurance processes, and/or the like. Here, the system may transmit the first resource program code to a lower build deploy system 904 associated with the lower deployment environment system 902, prior to transmission of the first resource program code to a quality control testing system.

As indicated by blocks 924 and 926, the system may augment, via the lower build deploy system 904, a code merge associated with the first resource program code at a continuous integration system with a first validation of the first resource program code at a first time interval, prior to transmission of the first resource program code to a quality control testing system, Here, the system may insert/connect an augmented module component 904B and an artifactory system 904C to/with a continuous integration (CI) pipeline component 904A. Typically, the first validation of the program code comprises determining whether the first resource program code is associated with one or more critical security vulnerability records, and determining a successful first validation of the first resource program code in response to determining that the first resource program code is not associated with the critical security vulnerability record. Here, in response to the successful first validation of the first resource program code, the system may store the first resource program code at an artifactory system 904C, as indicated by block 928. Typically, the artifactory system 904C is structured to store binary code associated with the first resource program code.

The system may then transmit the validation results to the first network device 104, as indicated by block 930. At block 932, the system may receive, via a lower deployment system 906, a request for transmission of the validated first resource program code to the quality control testing system from a first network device 104 at a second time interval succeeding the first time interval. In some instances the duration between the first and second time intervals may be vast, during which several changes may occur to the first resource program code, as well as the security data. At block 934, the system may extract, via the lower deployment system 906, the first resource program code from the artifactory system 904C to the lower build deploy system 904. The system may then initiate a second validation of the first resource program code at the second time interval, based on at least one or more categorical network program resource component records associated with a dynamic validated network resource library 190, as indicated by block 936.

In some embodiments, the second validation of the first resource program code comprises splitting the first resource program code component into a plurality of code portions, and validating each of the plurality of code portions based on at least the one or more categorical network program resource component records associated with the dynamic validated network resource library 190, as described previously with respect to FIGS. 7-8.

In some embodiments, the second validation of the first resource program code comprises constructing a retrieval rule based on determining one or more data fields associated with the first resource program code, and determining one or more dependent network program resource components of the first distributed network that are mapped to the first resource program code based on analyzing one or more one or more records of the plurality of categorical network program resource component records that match the retrieval rule. Here, the second validation of the first resource program code comprises validating each of the one or more dependent network program resource components of the first distributed network.

At block 938, the system may analyze and validate dependent network program resource components. At block 940, the system may, only in response to a successful second validation of the first resource program code, (i) restore the first resource program code at the artifactory system 904C, and (ii) allow deployment of the first resource program code to the lower deployment environment 910.

Here, in some embodiments, the system may construct categorical records for the validated resource program code, in a manner similar to that described previously with respect to FIGS. 3A-5. In general, the system may determine a plurality of technology elements associated with the first resource program code, and construct a first network program resource component data structure comprising a plurality of attribute objects, wherein each of the plurality of technology elements is associated with one or more of the plurality of attribute objects. Next, the system may transform the first network program resource component data structure into a first categorical network program resource component record by denormalizing a data structure file format associated with the first network program resource component data structure. The system may store the first categorical network program resource component record at a network resource structure database 180. In response to a successful second validation of the first resource program code, the system may store the first categorical network program resource component record at the dynamic validated network resource library 190.

In some embodiments, similar to the critical security vulnerability validation described previously with respect to FIG. 3B, the second validation of the first resource program code further comprises: determining whether a version associated with the first resource program code is associated with a critical security vulnerability record, and determining the successful second validation of the first resource program code in response to determining that the version of the first resource program code is not associated with the critical security vulnerability record.

In some embodiments, similar to the scan success validation described previously with respect to FIG. 3B, the second validation of the first resource program code further comprises: determining whether a scan of a version associated with the first resource program code is successful, and determining the successful second validation of the first resource program code in response to determining that the scan of the version of the first resource program code is successful.

In some embodiments, similar to the source validation described previously with respect to FIG. 3B, wherein the second validation of the first resource program code further comprises: determining whether a source entity associated with the first resource program code is associated with the one or more categorical network program resource component records of the dynamic validated network resource library, and determining the successful second validation of the first resource program code in response to determining that the source entity of the first resource program code matches the one or more categorical network program resource component records of the dynamic validated network resource library.

In some embodiments, similar to the component file validation described previously with respect to FIG. 3B, the second validation of the first resource program code further comprises: determining whether a version of the first resource program code is associated with a component file, and determining the successful second validation of the first resource program code in response to determining that the version of the first resource program code does matches the component file.

In some embodiments, in response to a successful second validation of the first resource program code, insert a deploy flag at the first resource program code at the artifactory system 904C, wherein the deploy flag is structured to allow deployment of the first resource program code to the lower deployment environment 910. Moreover, in response to a successful second validation of the first resource program code, the system may insert a deploy flag at the first resource program code at the artifactory system 904C, wherein the deploy flag is structured to allow deployment of the first resource program code to the lower deployment environment 910.

The system may deploy the first resource program code to the lower deployment environment 910 via a script deploy component 908. At block 952, the system may receive, via a higher deployment system 912, a request for transmission of the first resource program code from the lower deployment environment 910 to a higher deployment environment 914 at a third time interval succeeding the second time interval.

At block 954, the system may validate a signature credential (e.g., a validation check, deploy flag, and/or the like) associated with the first resource program code. At block 956, the system may (i) in response to determining that the first resource program code is associated with a deploy flag, and (ii) in response to the successful validation of the signature credential, initiate a third validation of the first resource program code at the second time interval, based on at least one or more categorical network program resource component records associated with the dynamic validated network resource library 190.

In response to a successful third validation of the first resource program code, the system may initiate deployment of the first resource program code to the higher deployment environment 914 via the script deploy component 908. Here, the higher deployment environment 914 is associated with a production environment of the first distributed network. At block 958, the system may in response to an unsuccessful second validation of a second resource program code, insert a prevent deploy flag at the second resource program code at the artifactory system 904C, wherein the prevent deploy flag is structured to prevent deployment of the second resource program code to the lower deployment environment 910.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein, rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. In some embodiments, the data transformation and security application 144 may be referred to as a "module" stored in the at least one memory device 140, comprising computer readable instructions 142, that when executed by the at least one processor/processing device 138, cause the at least one processor to perform one or more steps described with respect to FIGS. 3-5. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F3.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent application.

| U.S. patent application Ser. No. | Title | Filed On |
| --- | --- | --- |
| 17/886,822 | ELECTRONIC SECURITY SYSTEM OF NETWORK RESOURCE COMPONENT | Aug. 12, 2022 |
| | TRACKING AND ANALYSIS ACROSS A DISTRIBUTED NETWORK AND CONSTRUCTION OF A VALIDATED NETWORK RESOURCE COMPONENT LIBRARY | |
| 17/886,846 | DYNAMIC QUARANTINE ENGINE INTEGRATION WITH A VALIDATED NETWORK RESOURCE COMPONENT LIBRARY FOR NETWORK SECURITY | Aug. 12, 2022 |
| 17/886,862 | ELECTRONIC SYSTEM FOR SECURITY ANALYSIS AND VALIDATION DURING CONSTRUCTION AND DEPLOYMENT OF DYNAMIC NETWORK COMPONENTS | Aug. 12, 2022 |

What is claimed is:

1. A system for dynamic adapted security analysis of network resource components, wherein the system is structured for providing proactive network security by dynamically analyzing entering network resource components for vulnerabilities, establishing adapted validation thresholds and mitigation actions, and preventing unsuccessfully validated network resource components in a distributed network, the system comprising:

at least one memory device with computer-readable program code stored thereon;

at least one communication device;

at least one processing device operatively coupled to the at least one memory device and the at least one communication device, wherein executing the computer-readable code is configured to cause the at least one processing device to:

detect, via a network proxy component, an incoming file transfer associated with a first network program resource component at a first distributed network initiated by a first user at first network device of the first distributed network;

in response to determining, via the network proxy component, that a file attribute data element associated with the first network program resource component is associated with a predetermined file type, (i) block the incoming file transfer associated with the first network program resource component at the first distributed network, and (ii) automatically redirect a current interface displayed at the first network device to a dynamic validated network resource library interface associated with a dynamic validated network resource library, wherein the file attribute data element is associated with a file name of the first network program resource component;

receive, via the dynamic validated network resource library interface, a request for the first network program resource component from the first user via the first network device;

download the first network program resource component to a network quarantine component associated with the first distributed network;

initiate, via the network quarantine component, dynamic validation of the first network program resource component based on at least one or more categorical network program resource component records associated with the dynamic validated network resource library;

in response to a successful validation of the first network program resource component, construct a transmission of the downloaded first network program resource component to the first network device such that the first network program resource component cannot be executed at the first network device when the dynamic validated network resource library does not comprise the first network program resource component; and initiate the transmission of the downloaded first network program resource component to the first network device.

2. The system of claim 1, wherein executing the computer-readable code is configured to cause the at least one processing device to:

construct a retrieval rule associated with the first network program resource component based on determining one or more data fields associated with the network program resource component;

retrieve one or more first categorical network program resource component records of a plurality of categorical network program resource component records based on the retrieval rule from the dynamic validated network resource library;

parse the one or more first categorical network program resource component records to determine whether the one or more first categorical network program resource component records match the first network program resource component; and in response to determining that the one or more first categorical network program resource component records match the first network program resource component, allow installation of the first network program resource component at the first network device.

3. The system of claim 1, wherein executing the computer-readable code is configured to cause the at least one processing device to:

construct a retrieval rule associated with the first network program resource component based on determining one or more data fields associated with the network program resource component;

retrieve one or more first categorical network program resource component records of a plurality of categorical network program resource component records based on the retrieval rule from the dynamic validated network resource library;

parse the one or more first categorical network program resource component records to determine whether the one or more first categorical network program resource component records match the first network program resource component; and in response to determining that the one or more first categorical network program resource component records do not match the first network program resource component, prevent installation of the first network program resource component at the first network device.

4. The system of claim 1, wherein the dynamic validation of the first network program resource component further comprises:

determining whether a version associated with the first network program resource component is associated with a critical security vulnerability record; and determining an unsuccessful validation of the first network program resource component in response to determining that the version of the first network program resource component is associated with the critical security vulnerability record.

5. The system of claim 1, wherein the dynamic validation of the first network program resource component further comprises:

determining whether a version associated with the first network program resource component is associated with one or more critical security vulnerability records;

determining a successful validation of the first network program resource component at a first time interval, in response to determining that the version of the first network program resource component is not associated with the one or more critical security vulnerability records;

initiating an update of the one or more critical security vulnerability records; and determining, dynamically, an unsuccessful validation of the first network program resource component at a second time interval succeeding the first time interval, in response to determining that the version of the first network program resource component is associated with the updated one or more critical security vulnerability records.

6. The system of claim 1, wherein the dynamic validation of the first network program resource component further comprises:

determining whether a scan of a version associated with the first network program resource component is successful; and determining an unsuccessful validation of the first network program resource component in response to determining that the scan of the version of the first network program resource component is unsuccessful.

7. The system of claim 1, wherein the dynamic validation of the first network program resource component further comprises:

determining whether a source entity associated with the first network program resource component is associated with the one or more categorical network program resource component records of the dynamic validated network resource library; and determining an unsuccessful validation of the first network program resource component in response to determining that the source entity of the first network program resource component does not match the one or more categorical network program resource component records of the dynamic validated network resource library.

8. The system of claim 1, wherein the dynamic validation of the first network program resource component further comprises:

determining whether a version of the first network program resource component is associated with a component file; and determining an unsuccessful validation of the first network program resource component in response to determining that the version of the first network program resource component does not match the component file.

9. The system of claim 1, wherein determining that the file attribute data element associated with the first network program resource component is associated with the predetermined file type comprises determining that the first network program resource component is an executable type file.

10. The system of claim 1, wherein executing the computer-readable code is configured to cause the at least one processing device to:
  determine whether the first user is associated with a download permission at the first network device;
  determine whether the first user is associated with an install permission at the first network device; and
  in response to determining that the first user is associated with the download permission and the install permission at the first network device, revoke the download permission or the install permission of the first user at the first network device.

11. The system of claim 1, wherein executing the computer-readable code is configured to cause the at least one processing device to:
  in response to determining, via the network proxy component, that a file attribute data element associated with a second network program resource component is associated with the predetermined file type, block the incoming file transfer associated with the second network program resource component at the first distributed network;
  in response to a request for the second network program resource component from a second network device, download the second network program resource component to the network quarantine component associated with the first distributed network; and
  in response to an unsuccessful validation of the first network program resource component, prevent transmission of the second network program resource into the first distributed network.

12. A computer program product for dynamic adapted security analysis of network resource components, wherein the computer program product is configured for providing proactive network security by dynamically analyzing entering network resource components for vulnerabilities, establishing adapted validation thresholds and mitigation actions, and preventing unsuccessfully validated network resource components in a distributed network, the computer program product comprising a non-transitory computer-readable storage medium having computer-executable instructions for causing a computer processor to:
  detect, via a network proxy component, an incoming file transfer associated with a first network program resource component at a first distributed network initiated by a first user at first network device of the first distributed network;
  in response to determining, via the network proxy component, that a file attribute data element associated with the first network program resource component is associated with a predetermined file type, (i) block the incoming file transfer associated with the first network program resource component at the first distributed network, and (ii) automatically redirect a current interface displayed at the first network device to a dynamic validated network resource library interface associated with a dynamic validated network resource library, wherein the file attribute data element is associated with a file name of the first network program resource component;
  receive, via the dynamic validated network resource library interface, a request for the first network program resource component from the first user via the first network device;
  download the first network program resource component to a network quarantine component associated with the first distributed network;
  initiate, via the network quarantine component, dynamic validation of the first network program resource component based on at least one or more categorical network program resource component records associated with the dynamic validated network resource library;
  in response to a successful validation of the first network program resource component, construct a transmission of the downloaded first network program resource component to the first network device such that the first network program resource component cannot be executed at the first network device when the dynamic validated network resource library does not comprise the first network program resource component; and
  initiate the transmission of the downloaded first network program resource component to the first network device.

13. The computer program product of claim 12, the non-transitory computer-readable storage medium further comprises computer-executable instructions for causing the computer processor to:
  construct a retrieval rule associated with the first network program resource component based on determining one or more data fields associated with the network program resource component;
  retrieve one or more first categorical network program resource component records of a plurality of categorical network program resource component records based on the retrieval rule from the dynamic validated network resource library;
  parse the one or more first categorical network program resource component records to determine whether the one or more first categorical network program resource component records match the first network program resource component; and
  in response to determining that the one or more first categorical network program resource component records match the first network program resource component, allow installation of the first network program resource component at the first network device.

14. The computer program product of claim 12, the non-transitory computer-readable storage medium further comprises computer-executable instructions for causing the computer processor to:
  construct a retrieval rule associated with the first network program resource component based on determining one or more data fields associated with the network program resource component;
  retrieve one or more first categorical network program resource component records of a plurality of categorical network program resource component records based on the retrieval rule from the dynamic validated network resource library;
  parse the one or more first categorical network program resource component records to determine whether the one or more first categorical network program resource component records match the first network program resource component; and
  in response to determining that the one or more first categorical network program resource component records do not match the first network program resource component, prevent installation of the first network program resource component at the first network device.

15. The computer program product of claim 12, wherein determining that the file attribute data element associated with the first network program resource component is associated with the predetermined file type comprises determining that the first network program resource component is an executable type file.

16. A method for dynamic adapted security analysis of network resource components, wherein the method is configured for providing proactive network security by dynamically analyzing entering network resource components for vulnerabilities, establishing adapted validation thresholds and mitigation actions, and preventing unsuccessfully validated network resource components in a distributed network, the method comprising:
- detecting, via a network proxy component, an incoming file transfer associated with a first network program resource component at a first distributed network initiated by a first user at first network device of the first distributed network;
- in response to determining, via the network proxy component, that a file attribute data element associated with the first network program resource component is associated with a predetermined file type, (i) blocking the incoming file transfer associated with the first network program resource component at the first distributed network, and (ii) automatically redirecting a current interface displayed at the first network device to a dynamic validated network resource library interface associated with a dynamic validated network resource library, wherein the file attribute data element is associated with a file name of the first network program resource component;
- receiving, via the dynamic validated network resource library interface, a request for the first network program resource component from the first user via the first network device;
- downloading the first network program resource component to a network quarantine component associated with the first distributed network;
- initiating, via the network quarantine component, dynamic validation of the first network program resource component based on at least one or more categorical network program resource component records associated with the dynamic validated network resource library;
- in response to a successful validation of the first network program resource component, constructing a transmission of the downloaded first network program resource component to the first network device such that the first network program resource component cannot be executed at the first network device when the dynamic validated network resource library does not comprise the first network program resource component; and
- initiating the transmission of the downloaded first network program resource component to the first network device.

17. The method of claim 16, wherein the method further comprises:
- constructing a retrieval rule associated with the first network program resource component based on determining one or more data fields associated with the network program resource component;
- retrieving one or more first categorical network program resource component records of a plurality of categorical network program resource component records based on the retrieval rule from the dynamic validated network resource library;
- parsing the one or more first categorical network program resource component records to determine whether the one or more first categorical network program resource component records match the first network program resource component; and
- in response to determining that the one or more first categorical network program resource component records match the first network program resource component, allowing installation of the first network program resource component at the first network device.

18. The method of claim 16, wherein the method further comprises:
- constructing a retrieval rule associated with the first network program resource component based on determining one or more data fields associated with the network program resource component;
- retrieving one or more first categorical network program resource component records of a plurality of categorical network program resource component records based on the retrieval rule from the dynamic validated network resource library;
- parsing the one or more first categorical network program resource component records to determine whether the one or more first categorical network program resource component records match the first network program resource component; and
- in response to determining that the one or more first categorical network program resource component records do not match the first network program resource component, preventing installation of the first network program resource component at the first network device.

19. The method of claim 16, wherein determining that the file attribute data element associated with the first network program resource component is associated with the predetermined file type comprises determining that the first network program resource component is an executable type file.

* * * * *